US012783113B2

(12) United States Patent
Jin et al.

(10) Patent No.: US 12,783,113 B2
(45) **Date of Patent: *Nov. 3, 2026**

(54) GESTURE-DRIVEN MESSAGE CONTENT RESIZING

(71) Applicant: Snap Inc., Santa Monica, CA (US)

(72) Inventors: Dennis Jin, Brooklyn, NY (US); Daniel Moreno, New York, NY (US)

(73) Assignee: SNAP INC., Santa Monica, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 18/818,362

(22) Filed: Aug. 28, 2024

(65) Prior Publication Data

US 2024/0419315 A1 Dec. 19, 2024

Related U.S. Application Data

(63) Continuation of application No. 18/110,842, filed on Feb. 16, 2023, now Pat. No. 12,112,025.

(51) Int. Cl.
*G06F 3/048* (2013.01)
*G06F 3/01* (2006.01)
(Continued)

(52) U.S. Cl.
CPC .......... *G06F 3/04845* (2013.01); *G06F 3/016* (2013.01); *G06F 3/0488* (2013.01)

(58) Field of Classification Search
CPC ....... G06F 3/04845; G06F 3/016; G06F 3/048
See application file for complete search history.

(56) References Cited

U.S. PATENT DOCUMENTS 1,106,342 A * 8/1914 Bristol .................. F16B 35/042 411/389
7,971,156 B2 6/2011 Albertson et al.
(Continued)

FOREIGN PATENT DOCUMENTS

CN 103049761 B 8/2016
EP 3141997 A1 * 3/2017 ............ G06F 9/453
(Continued)

OTHER PUBLICATIONS

Authors et al., Automatic Resize of Instant Messaging Window on Large Pasted Content, Apr. 15, 2014, IP.com Electronic. (Year: 2014).*
(Continued)

*Primary Examiner* — Linh K Pham
(74) *Attorney, Agent, or Firm* — SCHWEGMAN LUNDBERG & WOESSNER, P.A.

(57) ABSTRACT

A user interface with a message composition area is presented at a user device. The message composition area includes message content presented in a base size. The user interface further includes a resizing graphical element presented at a base position within the user interface. A resizing gesture commences at the base position. While the resizing gesture is in progress, the resizing gesture is tracked and the message content is dynamically resized as positioning of the resizing gesture changes relative to the base position. Transmission of a message is caused when ending of the resizing gesture is detected at an adjusted position relative to the base position. The message includes the message content in an adjusted size relative to the base size.

18 Claims, 21 Drawing Sheets

(51) Int. Cl.
*G06F 3/04845* (2022.01)
*G06F 3/0488* (2022.01)

(56) References Cited

U.S. PATENT DOCUMENTS

| | | | |
|---|---|---|---|
| 7,996,793 B2 | 8/2011 | Latta et al. | |
| 8,487,938 B2 | 7/2013 | Latta et al. | |
| 8,856,691 B2 | 10/2014 | Geisner et al. | |
| 9,086,731 B2 * | 7/2015 | Hisano | G06F 3/04886 |
| 9,225,897 B1 | 12/2015 | Sehn et al. | |
| 9,230,160 B1 | 1/2016 | Kanter | |
| 9,276,886 B1 | 3/2016 | Samaranayake | |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,264,209 B2 * | 4/2019 | Choi | H04N 21/42204 |
| 10,284,508 B1 | 5/2019 | Allen et al. | |
| 10,439,972 B1 | 10/2019 | Spiegel et al. | |
| 10,503,361 B2 | 12/2019 | Pierce et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,614,855 B2 | 4/2020 | Huang | |
| 10,748,347 B1 | 8/2020 | Li et al. | |
| 10,775,996 B2 | 9/2020 | Brody et al. | |
| 10,917,366 B2 * | 2/2021 | Cho | G06F 3/0488 |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,036,954 B2 | 6/2021 | Lee et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2005/0172239 A1 * | 8/2005 | Liu | G06F 3/04817 715/846 |
| 2009/0012788 A1 | 1/2009 | Gilbert et al. | |
| 2011/0301934 A1 | 12/2011 | Tardif | |
| 2012/0072856 A1 | 3/2012 | Park et al. | |
| 2013/0318437 A1 * | 11/2013 | Jung | G06F 40/114 715/251 |
| 2014/0019885 A1 | 1/2014 | Jung et al. | |
| 2014/0068504 A1 | 3/2014 | Sun et al. | |
| 2014/0115530 A1 * | 4/2014 | Wang | G06F 3/04883 715/788 |
| 2014/0171036 A1 | 6/2014 | Simmons | |
| 2015/0024715 A1 * | 1/2015 | Kwon | H04M 1/724 455/412.1 |
| 2015/0120293 A1 | 4/2015 | Wohlert et al. | |
| 2015/0227308 A1 | 8/2015 | Kim et al. | |
| 2015/0370320 A1 | 12/2015 | Connor | |
| 2016/0004672 A1 * | 1/2016 | Sakunkoo | H04L 51/08 715/269 |
| 2016/0117072 A1 * | 4/2016 | Sharifi | G06F 9/543 715/769 |
| 2016/0299556 A1 | 10/2016 | Jueng et al. | |
| 2016/0313877 A1 * | 10/2016 | Ha | G06F 3/04842 |
| 2017/0093769 A1 | 3/2017 | Lind et al. | |
| 2017/0123487 A1 | 5/2017 | Hazra et al. | |
| 2017/0147202 A1 * | 5/2017 | Donohue | G06F 3/04886 |
| 2017/0277684 A1 | 9/2017 | Dharmarajan Mary | |
| 2017/0277685 A1 | 9/2017 | Takumi | |
| 2017/0336960 A1 * | 11/2017 | Chaudhri | G06F 3/04883 |
| 2017/0351910 A1 | 12/2017 | Elwazer et al. | |
| 2018/0158370 A1 | 6/2018 | Pryor | |
| 2019/0065046 A1 * | 2/2019 | Kwon | H04M 1/72439 |
| 2020/0045006 A1 * | 2/2020 | Yi | H04L 51/42 |
| 2020/0326820 A1 | 10/2020 | Walkin et al. | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0286491 A1 * | 9/2021 | Duan | G06F 3/04845 |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0333979 A1 * | 10/2021 | Rockel | G06F 1/1643 |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0004696 A1 * | 1/2022 | Qi | G06F 3/0481 |
| 2022/0050582 A1 * | 2/2022 | Zhou | G06F 3/016 |
| 2022/0070385 A1 * | 3/2022 | Van Os | H04N 5/2621 |
| 2022/0188539 A1 | 6/2022 | Chan et al. | |
| 2022/0206588 A1 | 6/2022 | Canberk et al. | |
| 2022/0214800 A1 | 7/2022 | Dong et al. | |
| 2022/0300730 A1 | 9/2022 | Eirinberg et al. | |
| 2022/0300731 A1 | 9/2022 | Eirinberg et al. | |
| 2022/0326781 A1 | 10/2022 | Hwang et al. | |
| 2022/0334649 A1 | 10/2022 | Hwang et al. | |
| 2023/0001854 A1 * | 1/2023 | Bruflodt | B60R 1/23 |
| 2024/0004603 A1 * | 1/2024 | Qian | H04N 21/4223 |
| 2024/0203377 A1 * | 6/2024 | Muramatsu | G06F 3/04886 |
| 2024/0281125 A1 | 8/2024 | Jin et al. | |

FOREIGN PATENT DOCUMENTS

| | | | |
|---|---|---|---|
| EP | 3707693 | A1 | 9/2020 |
| KR | 20220158824 | A | 12/2022 |
| WO | WO-2016168591 | A1 | 10/2016 |
| WO | WO-2019094618 | A1 | 5/2019 |
| WO | WO-2022005687 | A1 | 1/2022 |
| WO | WO-2022005693 | A1 | 1/2022 |
| WO | WO-2022060549 | A2 | 3/2022 |
| WO | WO-2022066578 | A1 | 3/2022 |
| WO | WO-2022132381 | A1 | 6/2022 |
| WO | WO-2022146678 | A1 | 7/2022 |
| WO | WO-2022198182 | A1 | 9/2022 |
| WO | WO-2022216784 | A1 | 10/2022 |
| WO | WO-2022225761 | A1 | 10/2022 |
| WO | WO-2022245765 | A1 | 11/2022 |

OTHER PUBLICATIONS

Black et al., Automatic Resizing of Icons in Lists When the Parent Window Is Resized, Mar. 17, 2005, IP.com Electronic (Year: 2005).*

Franklin et al., Dynamic Sizing for Graphical Control Objects, Mar. 15, 2005, IP.com Electronic (Year: 2005).*

"U.S. Appl. No. 18/110,842, Non Final Office Action mailed Feb. 14, 2024", 18 pgs.

"U.S. Appl. No. 18/110,842, Notice of Allowance mailed Jun. 7, 2024", 20 pgs.

"U.S. Appl. No. 18/110,842, Response filed May 13, 2024 to Non Final Office Action mailed Feb. 14, 2024", 13 pgs.

"New on Zenly", Zenly on Twitter: Text-sizing, [Online] Retrieved from the Internet: <URL: https://twitter.com/zenly/status/1301175344653836290?lang=en>, [Retrieved on Nov. 29, 2022], (Sep. 2, 2020), 1 pg.

* cited by examiner

GESTURE-DRIVEN MESSAGE CONTENT RESIZING

CLAIM OF PRIORITY

This application is a continuation of U.S. patent application Ser. No. 18/110,842, filed Feb. 16, 2023, now issued as U.S. Pat. No. 12,112,025, which is incorporated herein by reference in its entirety.

TECHNICAL FIELD

The present disclosure relates generally to resizing of message content using a computer-implemented application.

BACKGROUND

The popularity of computer-implemented programs that permit users to access and interact with content and other users online continues to grow. Various computer-implemented applications exist that permit users to share content with other users through messaging clients running on user systems. Some of such computer-implemented applications can be designed to run on a mobile device such as a phone, a tablet, or a wearable device, while having a backend service provided on a server computer system to perform operations that may require resources greater than is reasonable to perform at a user system (e.g., storing large amounts of data or performing computationally expensive processing).

A messaging application executing at a user system may provide a user interface that allows a user to send and receive messages. The user interface may enable the user to include various types of message content, such as text or image content, in a message. The user interface may provide a message composition area where the user can add and edit message content before a message is transmitted to another user. For example, the user can perform editing user input actions to add desired text to the message composition area, and then select a user-selectable element in the form of a send button in the user interface to cause transmission of a message (that includes the desired text) to another user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
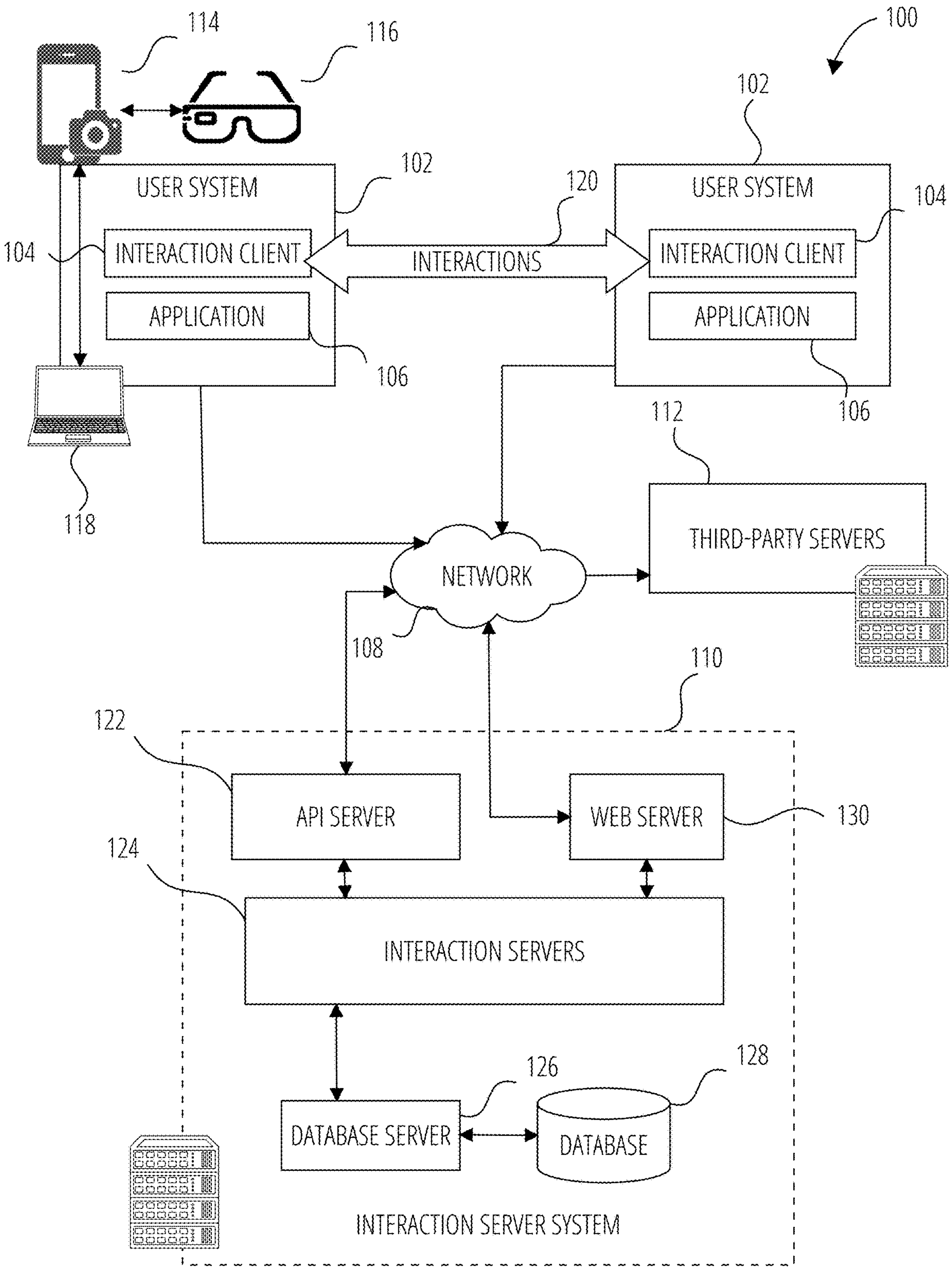
FIG. 1 is a diagrammatic representation of a networked environment in which the present disclosure may be deployed, according to some examples.

Examples of the present disclosure improve the functionality of electronic messaging software and systems by enhancing users' experience of using a messaging system. The users' experience of using a messaging system is enhanced by enabling users to resize message content using gestures. Message content resizing according to examples of the present disclosure allows users to send more expressive messages, providing a powerful interaction mechanism.

Conventional messaging applications typically present message content in a standard size within a user interface. Once a message composition area is populated with message content, the message content and/or the message composition area is generally static. Some systems may enable a user to adjust certain sizes. However, these systems may require a number of additional steps or selections to be performed prior to composing a message, or may lack the technical capabilities required to allow for dynamic, user-friendly and flexible resizing, as well as voiding of a resizing process, once the message composition area has been populated. Conventional systems may thus restrict users' experience. This may result in user confusion, wasted resources or sub-optimal efficiency.

Gesture-based message content resizing functionality may be provided by linking message content size to gesture location, or gesture translation, in a user interface. In some examples, a gesture location is dynamically tracked to cause automatic resizing of message content. The location of a user's gesture may be tracked relative to a base position associated with a base size, also referred to as a default size, causing gradual adjustment of message content size relative to the default size, and substantially in real-time, as the location is adjusted. For instance, where the gesture is a dragging gesture, this functionality may enable the user to perform an upward dragging motion to scale the message content up from the base size, or a downward dragging motion to scale the message content down from the base size.

In some examples, a message resizing state may be entered in response to an activation gesture. The user interface may be updated automatically, e.g., in response to an editing user input action, to resize a message composition area, to remove one or more messaging option graphical elements, and/or to add a resizing graphical element. To transition from a message composing state to the message resizing state, a user can engage the resizing graphical element in the user interface by way of the activation gesture, e.g., a press-and-hold gesture directed at the resizing graphical element, and then perform a resizing gesture, e.g., a dragging gesture, to cause the automatic resizing of message content.

In some examples, ending of the resizing gesture when the tracked location corresponds to an adjusted size results in automatic transmission of a message including the resized message content. For instance, the user performs a resizing gesture to resize message content from the base size associated with the base position to an adjusted size associated with a first position. The user then ends the resizing gesture, e.g., ends a dragging gesture, resulting in transmission of a message including the message content in the adjusted size. A recipient of the message may then be presented with the message, and specifically with the message content in the adjusted size (as opposed to the base size).

Keeping the gesture location at the base position, or returning the gesture location to the base position, may enable the user to retain the base size or return the size of the message content to the base size. Ending of the resizing gesture when the gesture location corresponds to the base position may result in automatic transitioning from the message resizing state back to a message composing state without causing transmission of the message, thus enabling the user to cancel the resizing process without sending the message content. Accordingly, responsive to detecting ending of the resizing gesture, transmission of the message content to a recipient (or recipients) may be based on a size of the message content relative to the base size.

When the effects in this disclosure are considered in aggregate, one or more of the methodologies described herein may improve known systems, providing additional functionality (such as, but not limited to, the functionality mentioned above), making them easier or more intuitive to operate, and/or obviating a need for certain efforts or resources that otherwise would be involved in a resizing technique. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to deploy particular technology and functionality within the interaction server system 110 initially, but later to migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Programming Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the client systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
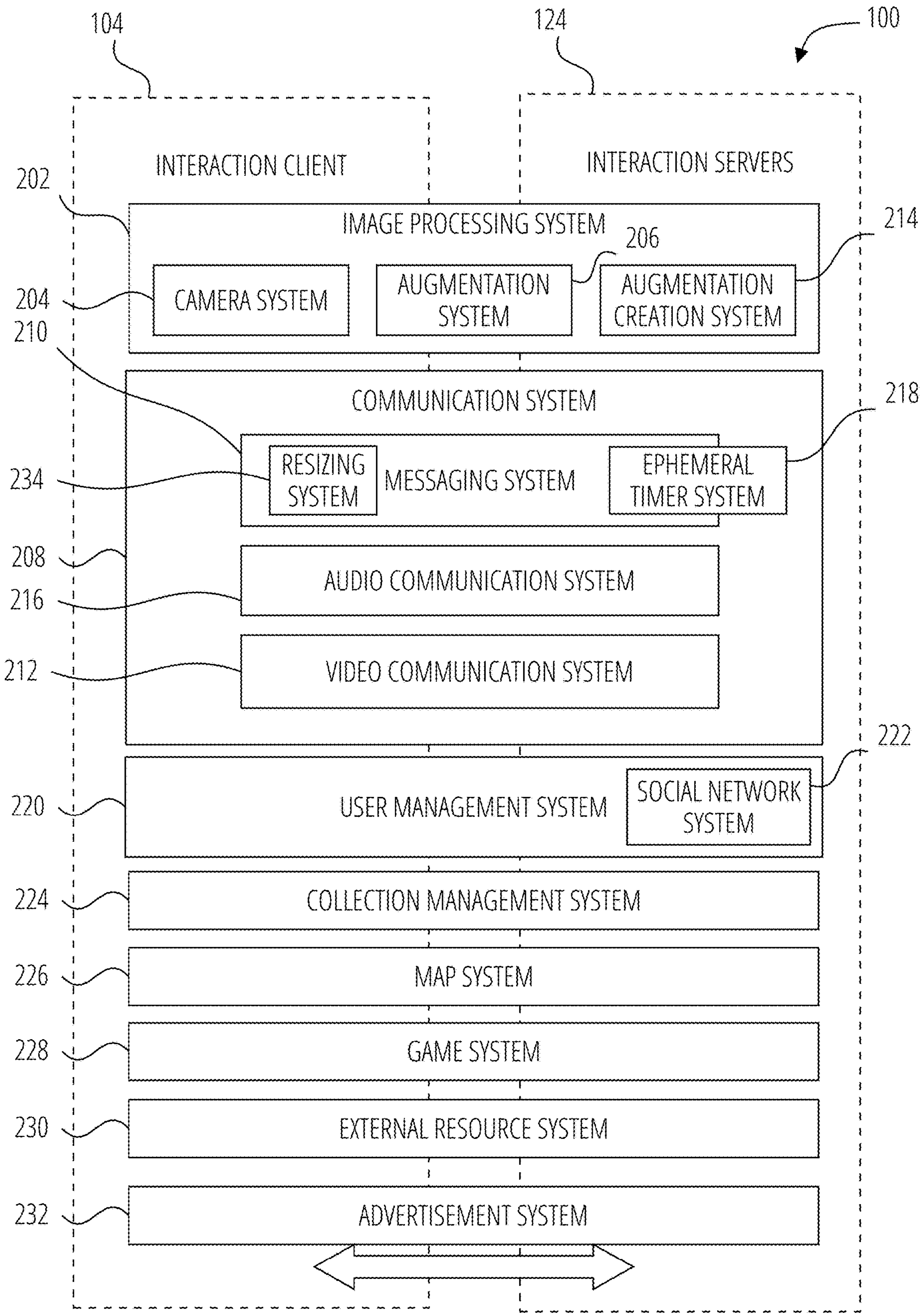
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 2102 of a user system 102. These augmentations are selected by the augmentation system 206 and presented to a user of an interaction client 104, based on a number of inputs and data, such as, for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

The messaging system 210 comprises a sub-system in the form of a resizing system 234, which is responsible for permitting users to adjust the size of various content items (e.g., by changing font sizes, scaling items up or down, etc.). For example, a user may be enabled to adjust the size of message content constituting, or forming part of, a message, before the message is transmitted to or shared with another user. The resizing system 234 enables and supports gesture-driven message content resizing, enabling a user to utilize one or more gestures to perform message content resizing. Message content resizing is enabled for various types of messages or content, e.g., messages forming part of a chat functionality of the interaction client 104, messages constituting responses to or comments on other messages or content items, or content forming part of a larger content item or content collection, such as text overlaid onto an image. The content may include text, visual content such as images, icons or videos, or combinations thereof. In certain examples, the resizing system 234 causes presentation of a resizing graphical element in a messaging user interface, allowing a user to enter a message resizing state by selecting the resizing graphical element (or a zone associated with the resizing graphical element).

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
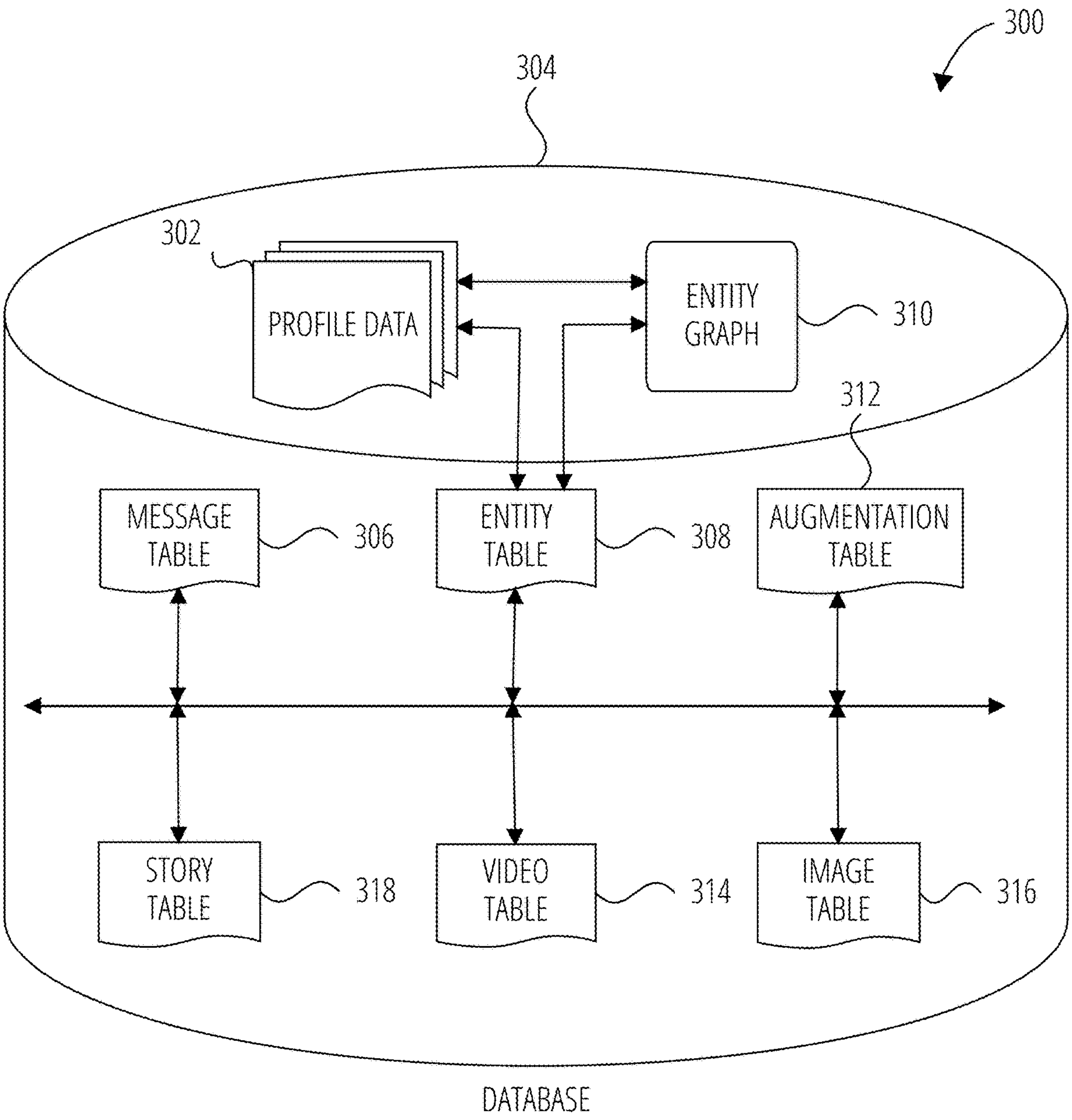
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Message data may also include details of the size (e.g., font size or image size) of one or more items of message content in the payload. The message data may further include data relating to available message sizes and/or logic for calculating and adjusting message sizes. Message sizes may be linked to gesture locations or gesture translations within a user interface, allowing a user to resize a message to one of the available message sizes by adjusting a location associated with a user gesture. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316). Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
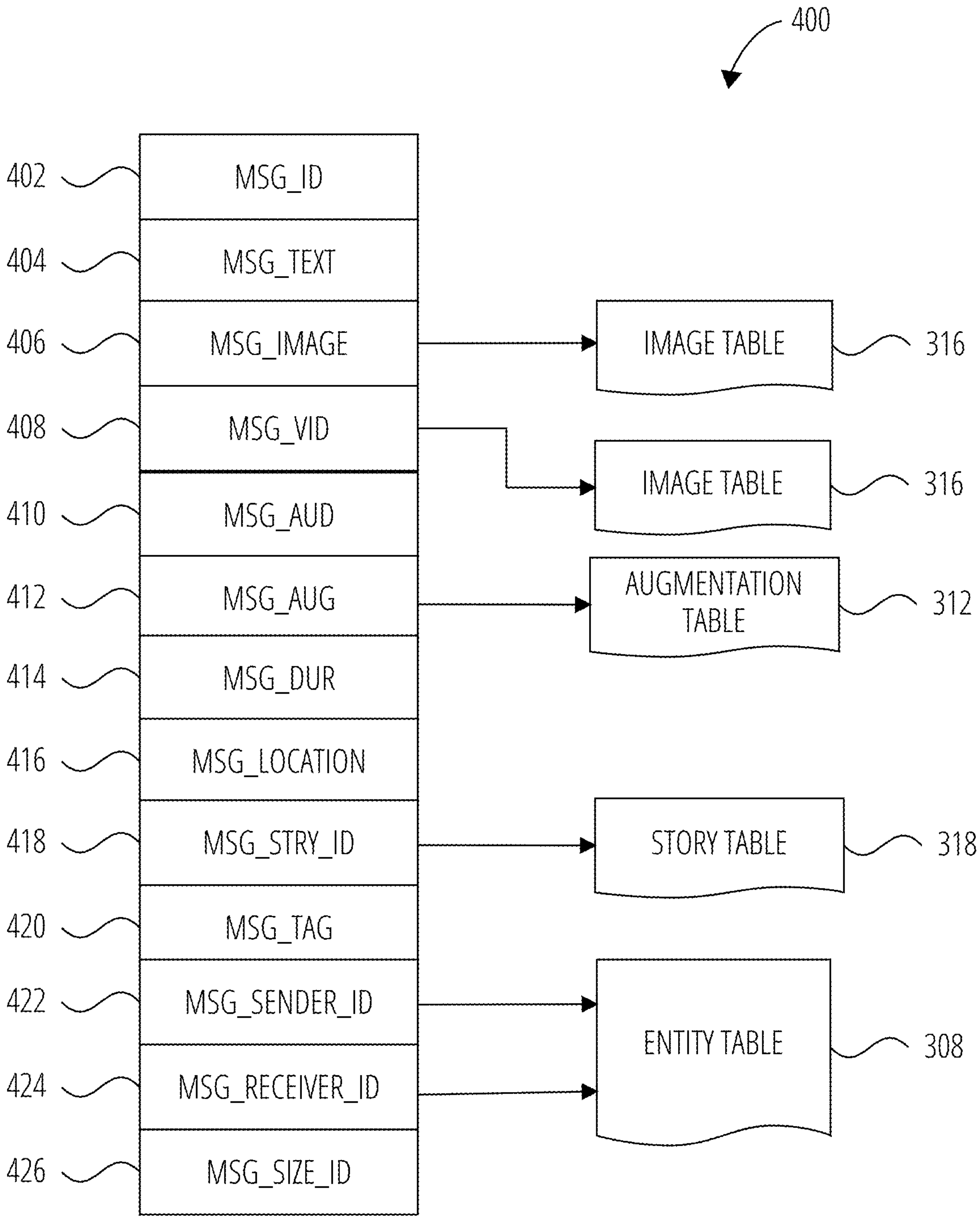
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400. In this context, "text" may include any suitable message content that the user can add to a message composition area (e.g., an input bar) of the interaction client 104 to include in the message 400. Accordingly, "text" is not limited to alphanumeric, special and other characters, but can also include image content such as icons or emojis, and the like.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

In some examples, the message 400 may include one or more message size identifier 426 indicative of, for instance, the size of content in the message text payload 404 (e.g., font size). This allows for messages that have been resized to a desired size by a sending user to be presented to a receiving user or a chat history zone in a messaging user interface in the desired size (or multiple desired sizes, where different items of message content in a message are assigned different sizes). The message text payload 404 may thus be linked to one or more sizes.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308. Similarly, a message size identifier 426 may point to data stored in the message table 306 identifying a size (e.g., font size) to be applied to a message when displaying it in a user interface.

Figure 5:
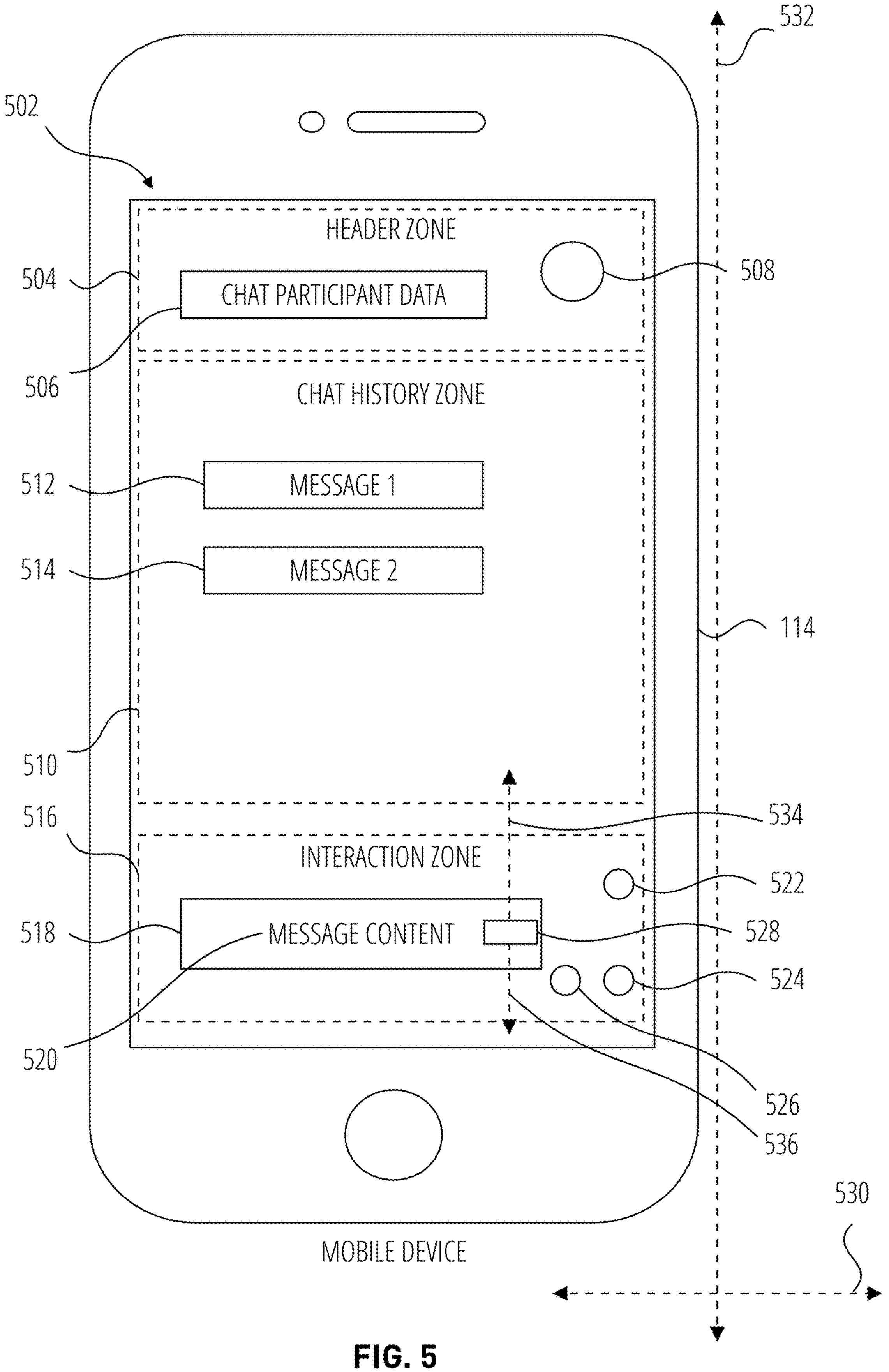
FIG. 5 is a user interface diagram illustrating aspects of gesture-driven message content resizing, according to some examples.

FIG. 5 is a user interface diagram depicting a messaging user interface 502, according to some examples, that may be presented to an active user by an interaction client 104 executing on a mobile device 114. While the messaging user interface 502 is described and shown in FIG. 5 as being presented to the active user on a screen of the mobile device 114, the messaging user interface 502 may also be presented to users using other devices that present such a user interface and enable the active user to provide user input, e.g., on a screen of a desktop computer, on the optical display of a head-wearable apparatus 116, or by way of "smart contact lenses".

In FIG. 5, the screen of the mobile device 114 is touch-sensitive, enabling the active user to provide user input by way of a variety of touch gestures. The user may utilize one or more fingers, a stylus, or another input device to perform gestures. Examples of touch gestures include tapping, double-tapping, pressing, pressing-and-holding, one-axis dragging, two-axis dragging, free movement dragging, pinching, spreading, or flicking. Each gesture may enable the user to perform one or more actions or initiate one or more states in the interaction client 104. For instance, flicking up and down may enable the user to scroll up and down (e.g., through the chat history zone 510 of the messaging user interface 502, as described below).

The messaging user interface 502 enables and facilitates messaging functionality of the interaction system 100, including the resizing system 234. As shown in FIG. 5, the messaging user interface 502 presents a header zone 504, a chat history zone 510, and an interaction zone 516. The header zone 504 includes chat participant data 506, such as the name of the other user (or users) forming part of a conversation ("chat") with the active user, as well as a call button 508 enabling the active user to contact the other user (or users) by way of a voice or video call. The other user may be referred to as the recipient.

The chat history zone 510 enables the active user to view a conversation history by navigating through previous messages shared by users forming part of the chat. Example messages 512 and 514 ("Message 1" and "Message 2," respectively) are shown in FIG. 5. The chat history zone 510 also enables the active user to select a specific message, e.g., by performing a press-and-hold gesture on the message 512, in order to reply or react to that message via the interaction client 104.

The interaction zone 516 is shown as being presented below the chat history zone 510 in a lower region of the messaging user interface 502. The interaction zone 516 provides the active user with various messaging options, including a message composition area in the example form of an input bar 518. The input bar 518 allows the active user to compose a message. The active user may utilize various editing user input actions, e.g., using a keyboard to add and/or edit message content 520 (a keyboard may form part of the interaction zone 516 in some examples, or may be provided by an input device connected to the mobile device 114 in other examples). Once the active user is satisfied with the message content 520 in the input bar 518, a message can be finalized and sent, e.g., by user selection of a send button 522, causing the message (including the message content 520) to be added to the chat history zone 510.

The interaction zone 516 also includes additional messaging option graphical elements. The messaging option graphical element 524 and the messaging option graphical element 526 are shown as examples in FIG. 5. Each messaging option graphical element is user-selectable to allow the active user to access a respective messaging feature of the interaction client 104. In FIG. 5, the messaging option graphical element 524 is user-selectable to access a library of avatar icons and/or emoji icons that can be included in the message content 520, and the messaging option graphical element 526 is user-selectable to access a media library for adding image or video content to a message.

In some examples, a user using the interaction client 104 is provided with an enhanced experience by enabling the user to resize message content using predefined gestures. In FIG. 5, the messaging user interface 502 includes, in the input bar 518, a resizing graphical element 528. The resizing graphical element 528 can be selected to invoke a message resizing state of the interaction client 104. In some examples, the resizing graphical element 528 is directly user-selectable by way of pressing and holding on the resizing graphical element 528 itself. In other examples, the resizing graphical element 528 indicates to the active user that the entire input bar 518 is user-selectable to invoke the message resizing state. In other words, the user may press-and-hold anywhere on the input bar 518 to activate the resizing function in such examples.

In some examples, the resizing graphical element 528 is not presented in the messaging user interface 502 until the user performs a predefined user input action. For example, the resizing graphical element 528 may be absent from the input bar 518 initially and only be presented in response to the active user starting to compose a message. In other words, in response to detecting a predefined editing user input action (e.g., the user typing a message), the resizing graphical element 528 may be displayed as shown in FIG. 5, alerting the active user to the availability of the resizing function.

To transition from a message composing state in which the message content 520 can be created and edited, to the message resizing state, the active user may perform an activation gesture in the example form of a press-and-hold gesture directed at the resizing graphical element 528 (or a zone associated with the resizing graphical element 528, as explained above). Resizing of the message content 520 is enabled in the message resizing state and disabled in the message composing state.

The press-and-hold gesture is a touch gesture directed at the (touch-sensitive) screen of the mobile device 114, and is also referred to as a "long press" gesture. For example, the "long press" gesture may be carried out when a touch input is held down for a longer duration than a normal tap, typically around 500 milliseconds or another predefined duration. The interaction client 104 detects user-selection of the resizing graphical element 528 and transitions to the message resizing state. The active user may then, prior to ending the press-and-hold gesture, perform a resizing gesture in the example form of a dragging gesture. In other words, while continuing to hold down on the screen, the active user performs the dragging gesture. The dragging gesture is also a touch gesture directed at the screen of the mobile device 114. In some examples, and as described further below, the dragging gesture is tracked by the interaction client 104 as a single-axis dragging gesture.

The "long press" and "dragging" gestures are examples only and it should be appreciated that, in some examples, other types of gestures may be employed, e.g., "panning" instead of "dragging."

As indicated above, these example gestures may be performed using a finger, a stylus, or other device. Primarily for ease of reference, the term "user input element" is used herein to refer to the element being used to perform the gesture, e.g., the finger or other element used by the user to touch the screen. It should be appreciated that, while examples described herein illustrate gesture-based message content resizing with reference to touch gestures, techniques described herein may be applied using other types of gestures that do not involve direct touching of a screen or other input device.

The location of the resizing gesture within the messaging user interface 502 may be tracked and the size of the message content 520 may be adjusted dynamically, based on this location. In some examples, the "location of the resizing gesture" refers to the location of the user input element being used to perform the resizing gesture. The location of the user input element may be tracked relative to a starting position, or base position, and the translation between the two positions may be used to calculate an adjusted size for the message content 520, as described further below.

The messaging user interface 502 of FIG. 5 has an X-axis 530 and a Y-axis 532. While in the message resizing state, and commencing with the user input element at a base position corresponding to the (original) position of the resizing graphical element 528, the user may selectively and dynamically resize the message content 520 by performing the dragging gesture. Upon commencement of the message resizing state, the message content 520 has a base size, or default size, associated with the user input element and the resizing graphical element 528 being at the base position. As indicated by the upward arrow 534 and the downward arrow 536 (both extending along the Y-axis 532), respectively, the messaging user interface 502 enables the user to perform an upward dragging motion to scale the message content 520 up gradually from the base size, or a downward dragging motion to scale the message content 520 down gradually from the base size.

In some examples, the resizing graphical element 528 is displaced upwardly or downwardly relative to the base position shown in FIG. 5, as the user "drags" the resizing graphical element 528 along the Y-axis 532. The resizing graphical element 528 may be presented in a position (along the Y-axis 532) corresponding to the detected location of the user input element. For instance, the resizing graphical element 528 may be presented as moving up or down relative to other user interface elements, as the user performs the content resizing action. In this way, the position of the resizing graphical element 528 within the messaging user interface 502 may provide an indication of the relative size of the message content 520. Further, the input bar 518 may be resized to fit the resized message content, e.g., scaled up if the message content 520 is made bigger, and scaled down if the message content 520 is made smaller.

The activation gesture and the resizing gesture may be a combined gesture. For example, the interaction client 104 may detect that the user input element has pressed on the screen at or near the resizing graphical element 528 and that a dragging motion has commenced while the user input element is pressing down (without the user input element being removed from the screen) to move the user input element to a different location within the messaging user interface 502. Accordingly, the interaction client 104 may be configured to interpret this combination of a "long press" and a "drag" as a single resizing gesture and not as two independent gestures.

The interaction client 104 executing at the mobile device 114 obtains certain information relating to gestures performed by the active user. When the active user performs the activation gesture, the interaction client 104 detects that the activation gesture has been performed based on user-selection of the resizing graphical element 528 using the required press-and-hold gesture. In other words, the interaction client 104 detects both the type of gesture and the location within the messaging user interface 502 where the gesture is performed. In response to detecting that the user has selected the resizing graphical element 528 by way of a "long press", the message resizing state is invoked. If the user then proceeds by performing the appropriate resizing gesture, in addition to detecting starting and ending of the resizing gesture and the associated locations, the interaction client 104 obtains data indicative of the location of the user input element and/or translation of the user input element as the user input element moves across the messaging user interface 502. For example, while the active user is performing the dragging motion, the interaction client 104 detects/tracks a current location of the user input element, a predicted end location (for example, through a property returning the location where dragging would stop if the gesture was to end immediately), a predicted end translation (for example, through a property returning the distance between the last detected location and the location where dragging would stop if the gesture was to end immediately), or the like.

In some examples, the interaction client 104 tracks translation along the Y-axis 532 from the base position (starting position). Using the detected translation, and based on a resizing algorithm, an adjusted size for the message content 520 is calculated and caused to be applied, substantially in real-time, to the message content 520 being presented in the messaging user interface 502. For example, the user may wish to adjust a font size of the message content 520 from a default size (base size) initially appearing in the messaging user interface 502, to an adjusted size, prior to sending the message. The interaction client 104 detects translation along the Y-axis 532, caused by the resizing gesture, and causes the size of the message content 520 to be automatically adjusted from the default size to the adjusted size. If the translation is an upward translation along the Y-axis 532, and in response to detecting such upward translation, the size of the message content 520 is increased, while if the translation is a downward translation along the Y-axis 532, and in response to detecting such downward translation, the size of the message content 520 is decreased.

The increasing and decreasing of the message content size may be gradual. For example, as the user drags the user input element further away from the base position in the upward direction, the message content 520 may gradually increase in size, or as the user drags the user input element further away from the base position in the downward direction, the message content 520 may gradually decrease in size. Haptic feedback may be provided by a haptic component of the mobile device 114 as the user performs the resizing gesture. In some examples, such feedback may make operation of the the system easier and more intuitive. The user may be enabled to scale the message content 520 up to a predefined maximum size that is greater than the default size, and down to a predefined minimum size that is smaller than the default size.

Once the user is satisfied with the adjusted size of the message content 520, the interaction client 104 enables the user to send the message (including the resized message content 520) conveniently and easily by way of a "release to send" function. In other words, the user can, in some examples, drag the user input element until the user is satisfied with the adjusted size, and then simply end the resizing gesture by releasing the user input element from the screen of the mobile device 114, causing the message to be transmitted. The transmitted message then appears as a new message, presented in the adjusted size within the chat history zone 510. Alternatively, the user may wish to void, or cancel, the resizing process without causing the message to be transmitted. To this end, the interaction client 104 may enable the user to drag the user input element back to the base position (starting position), or to within a predefined minimum distance of the base position, and perform a "release to cancel" action from that position. In other words, the user can release the user input element from the screen of the mobile device 114 with the user input element at or near the base position to return to the message composing state without causing the message to be transmitted. If the user does so, the message content 520 may be presented in the input bar 518 in the default size, as originally shown, allowing the user to continue composing the message, or to delete the message content 520. This voiding functionality may, for example, improve a messaging system by providing the user with more flexibility and enhanced efficiencies.

A process according to some examples may thus include basing transmission of the message content to a recipient on the size of the message content relative to the base size, or on the location of the resizing gesture relative to a base position or starting location.

Pseudocode illustrating process logic according to some examples, for implementing a resizing gesture, scaling, and haptic feedback, is included below. It should be appreciated that the pseudocode included below includes plain/simple language descriptions of certain steps in an algorithm, logic and/or other process. While the pseudocode uses structural conventions resembling a programming language, it is intended for human reading rather than machine reading. It may thus omit details that are essential for machine understanding, such as variable declarations and language-specific code.

Pseudocode illustrating process logic, according to some examples:

```
[ON GESTURE START]:
  y0 = y;
  level = 0;
  scaling = false;
END
[ON GESTURE ACTIVE]:
  BASE_FONT_SIZE = 16;
  y = y0 + translationY;
  dragging = true;
  if (
    scaling
    fontSize == BASE-FONT-SIZE &&
    Math.abs(velocityY) < 40
  ) {
    scaling = false;
    RUN_HEAVY_HAPTIC( ) // Heavy haptic
  }
  tempLevel = Math.round(
    interpolate(16 − y / 3, [8, 170], [0, 14]) // Extrapolation:
    CLAMP
  );
  if (level != tempLevel && scaling) {
    level = tempLevel;
    RUN_SELECTION_HAPTIC ( ) // Light haptic
  }
```

-continued

```
        if (Math.abs(y) > 40) {
            scaling = true;
        }
        fontSizeDiff = y > 0 ? y / 6 : y / 3;
        shouldBeBaseFontSize = Math.abs(y) < 30;
        fontSize = Math.min(
            Math.max(shouldBeBase ? BASE_FONT_SIZE :
BASE_FONT_SIZE - fontSizeDiff, 8),
            170
        );
    END
    [ON GESTURE END]:
        dragging = false;
        if (fontSize != BASE_FONT_SIZE ) {
            SEND_MESSAGE ( )
        }
```

A number of aspects included in the pseudocode above should be noted. The resizing function may have a base size (in the above pseudocode, the base size, or default size, is a font size of 16 pts (points)), a predefined minimum size (in the above pseudocode, this is a font size of 8 pts) and a predefined maximum size (in the above pseudocode, this is a font size of 170 pts). Further, if translation of less than a predefined minimum distance is detected, the size is not adjusted and remains at the default size (in the above pseudocode, if the gesture's Y-axis translation is less than 30 pts, the font size "snaps back" to the default size of 16 pt). In other words, the size of the message content is determined to correspond to the base size if the adjustment of the location of the resizing gesture relative to the base position is less than the predefined minimum distance. Similarly, if the size is still at the default size and the gesture velocity is below a certain level, scaling is not performed.

Additionally, the pseudocode provides examples of haptic feedback processes that may alert the user to selections and scaling actions. Haptic feedback is provided contemporaneously with resizing of the message content in some examples. As mentioned above, in some examples, the "release to send" function is only invoked if the size of the message content has actually been adjusted (in other words, the size is not the base size). This aspect is also illustrated in the above pseudocode.

Figure 6:
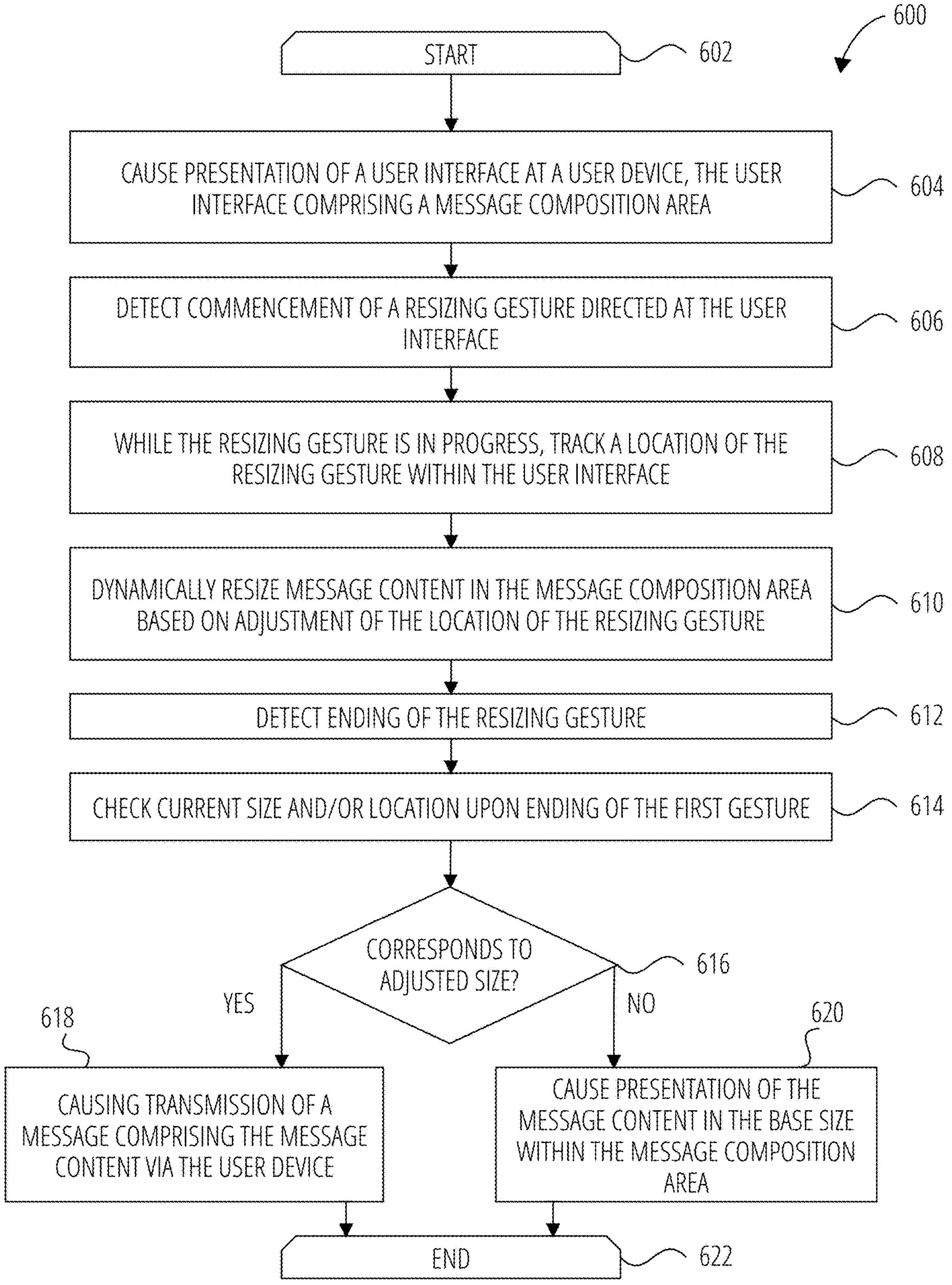
FIG. 6 is a flowchart illustrating a gesture-driven message content resizing process, according to some examples.

FIG. 6 is a flowchart illustrating a method 600, according to some examples, to enable an active user to resize message content within a user interface presented by a messaging application (e.g., the interaction client 104). The method 600 may be performed by components of the interaction system 100, including the messaging system 210 and its resizing system 234.

The method 600 commences at opening loop block 602 and progresses to block 604, where a user interface is presented at a user device (e.g., the mobile device 114). The user interface comprises a message composition area, such as the input bar 518 of FIG. 5. The active user adds desired message content to the message composition area. At this stage, the message content may be caused to be presented in the message composition area in a base size, or default size.

At block 606, commencement of a resizing gesture is detected. Prior to commencement of the resizing gesture, the active user may have selected a resizing graphical element (or a zone associated with the resizing graphical element) as part of an activation gesture, with user-selection of the resizing graphical element being detected by the interaction client 104. For example, in response to the active user adding the desired message content (or commencing adding thereof), the resizing graphical element may be presented. The resizing gesture in block 606 may be the dragging gesture as described with reference to FIG. 5, performed subsequent to commencement of the activation gesture, or it may be part of a combined activation and resizing gesture (e.g., a long press following by a drag, performed as an uninterrupted gesture).

The method 600 includes, at block 608, tracking a location of the resizing gesture within the user interface while the resizing gesture is in progress. As mentioned above, this may be effected by the interaction client 104 tracking the location of the user input element as it travels across the user interface while the dragging gesture is being performed.

At block 610, the method 600 is shown to include dynamically resizing the message content based on adjustment of the location of the resizing gesture. For example, translation of the user input element along the Y-axis of the user interface may be tracked, and this translation may be used to dynamically and update the size of the message content. For instance, if the user adjusts the location of the resizing gesture from a base position (being the starting position associated with the base size) to a first position associated with a first adjusted size, the interaction client 104 detects this translation and, responsive thereto, causes the size of the message content to be adjusted from the base size to the first adjusted size. As alluded to above, the location of the resizing gesture may be adjustable between a plurality of positions, including the base position and the first position, with the plurality of positions comprising one or more positions between the base position and the first position. In such examples, the resizing gesture causes gradual adjustment of the size of the message content from the base size to the first adjusted size based on adjustment of the location of the resizing gesture between the base position and the first position.

In some examples, the resizing graphical element is caused, by the interaction client 104, to move responsive to the movement of the user input element. Aligning the position of the resizing graphical element with the location of the user's gesture may provide for a user-friendly tool that presents a visual indication of the relative size or scaling factor of the message content. The resizing graphical element may be displaced together with the user input element only up to a maximum or minimum level. In other words, if the active user keeps dragging the user input element past, for example, the maximum upper level, the resizing graphical element will simply remain at the maximum upper level. This feature may assist the active user in determining that message content has been scaled to a maximum or minimum size.

Returning to block 610 in FIG. 6, as a result of the resizing gesture causing translation across the user interface, the message content is presented in the first adjusted size within the user interface. At this stage, the resizing gesture is still in progress and thus the message content is displayed in the message composition area in the first adjusted size. At block 612, ending of the resizing gesture is detected by the interaction client 104. When the resizing gesture ends, the interaction client 104 checks the end location of the resizing gesture and/or the current size of the message content to determine whether a message is to be transmitted via the user device (block 614). As explained above with reference to FIG. 5, in some examples, the message is only transmitted if the size of the message content has been changed (relative to the default size). Therefore, the interaction client 104 may check whether, at the time of ending of the resizing gesture, the message content has been resized relative to the base size (block 614). Alternatively, or additionally, the interaction client 104 may check the end location of the resizing gesture to determine whether it is at the base position, or within a predefined minimum distance of the base position.

If it is determined (at decision block 616) that the message content has been resized (or that the end location does not correspond to the base position), at block 618, the interaction client 104 causes a message including the resized message content to be transmitted via the user device. If it is determined (at decision block 616) that the message content has not been resized (or that the end location corresponds to the base position), at block 620, the message content is caused to be presented in the base size within the message composition area, and a message including the message content is not transmitted.

Accordingly, responsive to detecting ending of the resizing gesture, transmission of the message content to a recipient may be based on a size of the message content relative to the base size. The method ends at opening loop block 622.

FIG. 7 to FIG. 19 are user interface diagrams showing a user interface sequence. The sequence depicts various stages in a message content resizing process, according to some examples, performed using a messaging user interface 702. The messaging user interface 702 may be presented by an interaction client 104 executing on a user device such as the mobile device 114. The messaging user interface 702 is presented on a touch-sensitive display, enabling the user to provide user input by way of a variety of touch gestures using a user input element, as described above.

Figure 7:
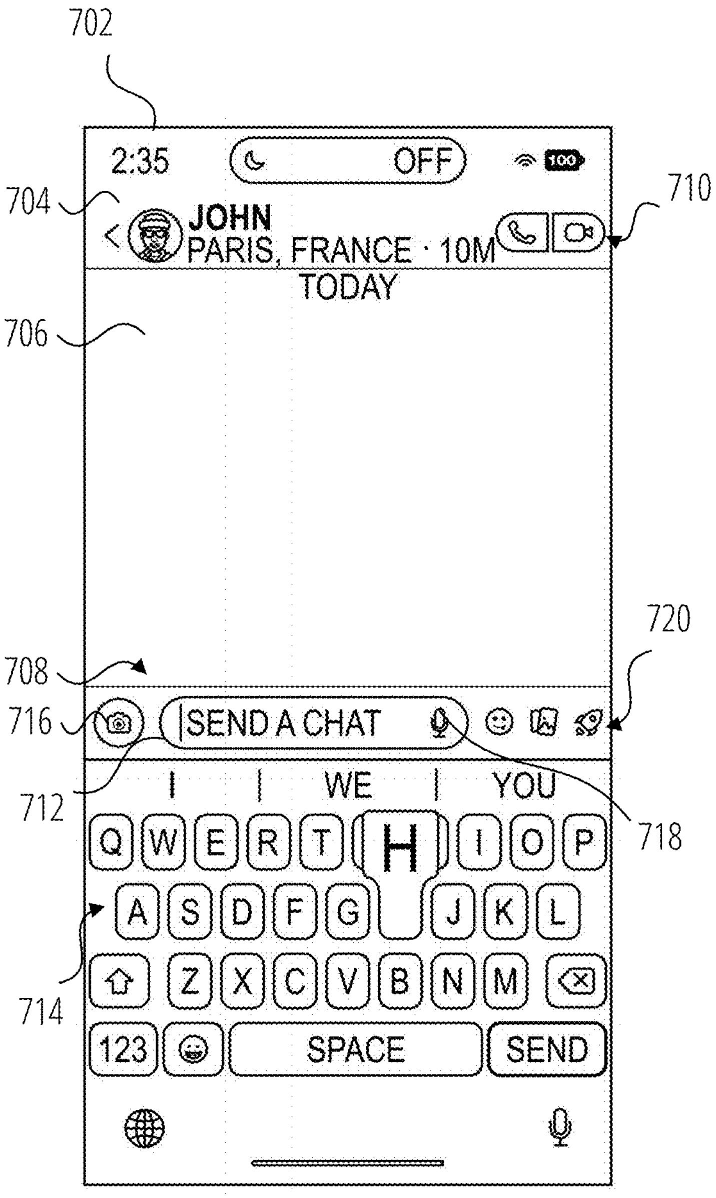
FIG. 7 is a user interface diagram illustrating a messaging user interface, according to some examples.

The messaging user interface 702 enables and facilitates messaging functionality of the interaction system 100, including the messaging system 210 and its resizing system 234. An active user is enabled to chat with another user of the interaction system 100 ("John", also referred to as the "recipient"). As shown in FIG. 7, the messaging user interface 702 presents a header zone 704, a chat history zone 706, and an interaction zone 708. The header zone 704 includes chat participant data, as well as call buttons 710 enabling the active user to contact the other user ("John") by way of a voice or video call. The chat history zone 706 enables the active user to view a conversation history by navigating through previous messages shared by users forming part of the chat.

The interaction zone 708 is shown as being presented below the chat history zone 706. The interaction zone 708 provides the user with various messaging options, including a message composition area in the example form of an input bar 712. The input bar 712 allows the user to compose a message through various editing user input actions, e.g., using a keyboard 714 to add message content to the input bar 712 and/or edit message content in the input bar 712. In FIG. 7, the keyboard 714 is an alphabet character keyboard. The active user also has access to other keyboards supported by the interaction client 104, such as the emoji keyboard 1402 shown in FIG. 14.

The interaction zone 708 includes additional messaging option graphical elements. These messaging option graphical elements include a camera button 716, a microphone button 718, and additional option buttons 720. Each messaging option graphical element is user-selectable to allow the user to access a respective messaging feature. The camera button 716 is user-selectable to access a camera interface to allow the user to capture an image or video. The microphone button 718 is user-selectable to invoke a recording function to allow the user to record an audio message. The additional option buttons 720 provide access to further options, such as a library of avatar icons, stickers, and/or emoji icons that can be included in the message content 520, the user's media library for adding image or video content to a message, and a gaming feature provided by the game system 228.

The messaging user interface 702 shown in FIG. 7 to FIG. 19 illustrates a private conversation where messages are exchanges between the active user and the other user, "John". It should, however, be appreciated that this is merely an example, and techniques described herein may be applied to various other types of messages and in various contexts, such as public group messages, comments, captions, etc.

Figure 8:
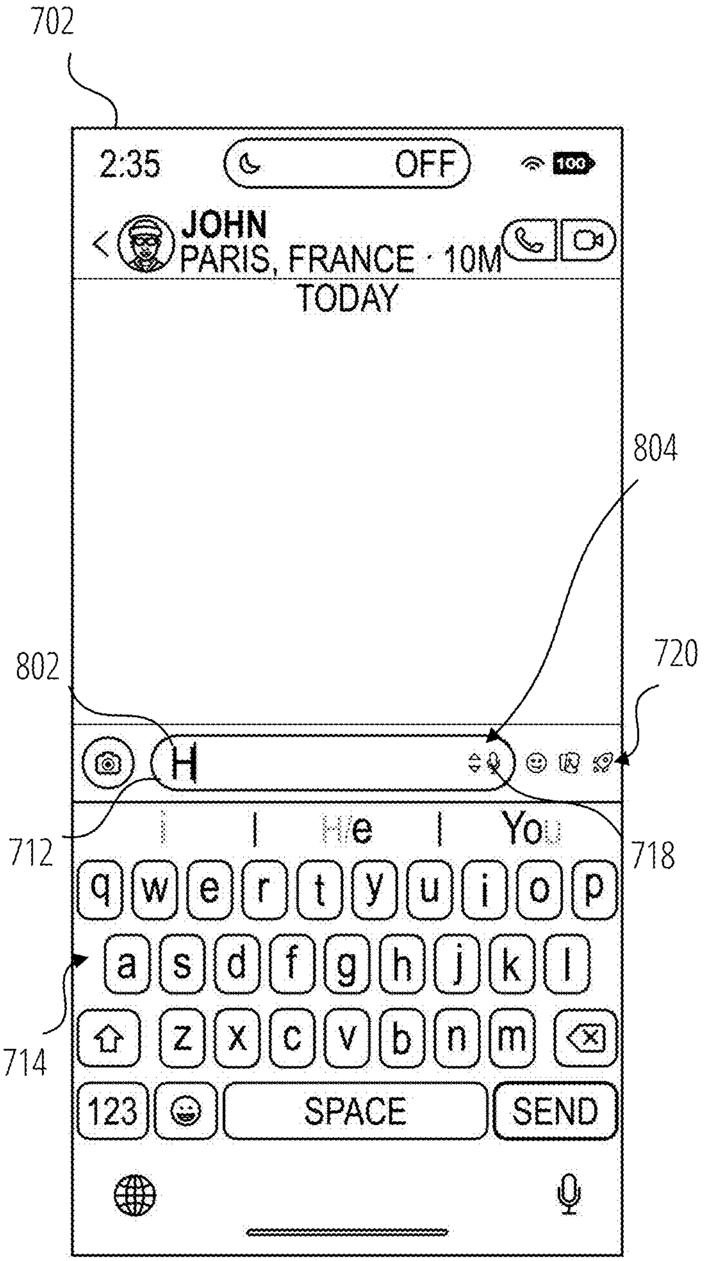
FIG. 8 is a user interface diagram illustrating editing user input action resulting in presentation of a resizing graphical element within a messaging user interface, according to some examples.
Figure 9:
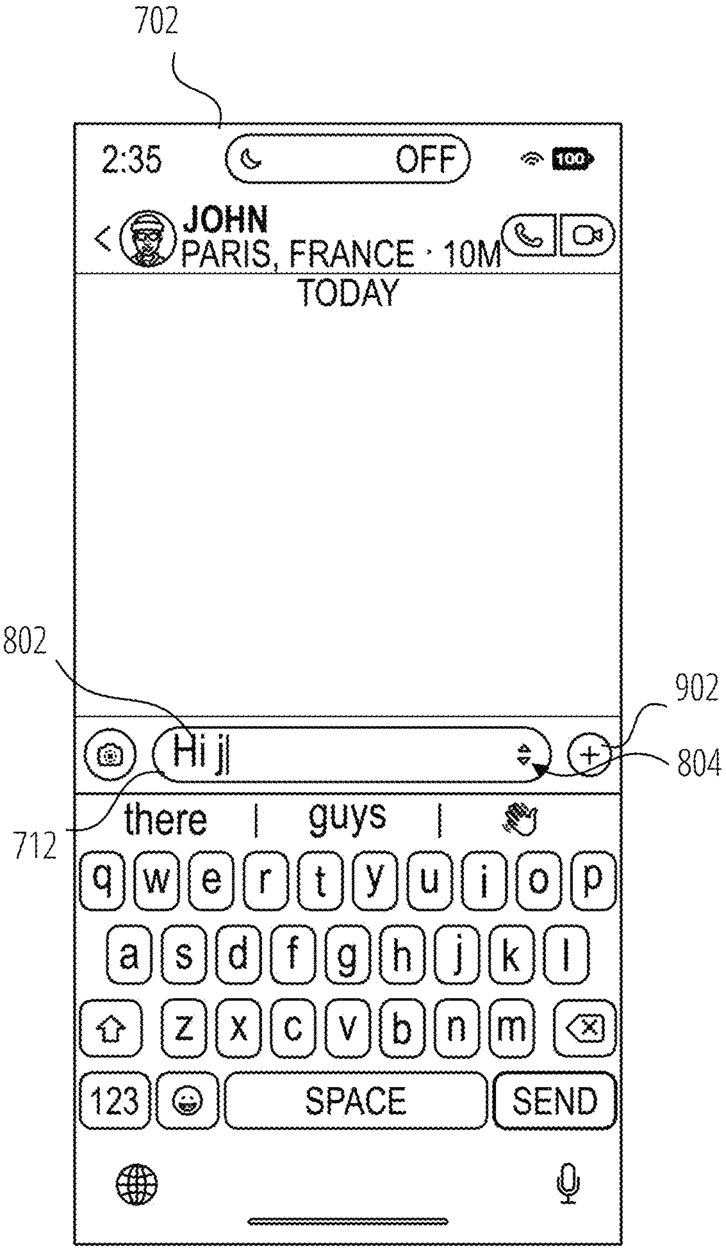
FIG. 9 is a user interface diagram illustrating editing user input action resulting in presentation of a resizing graphical element within a messaging user interface, according to some examples.
Figure 10:
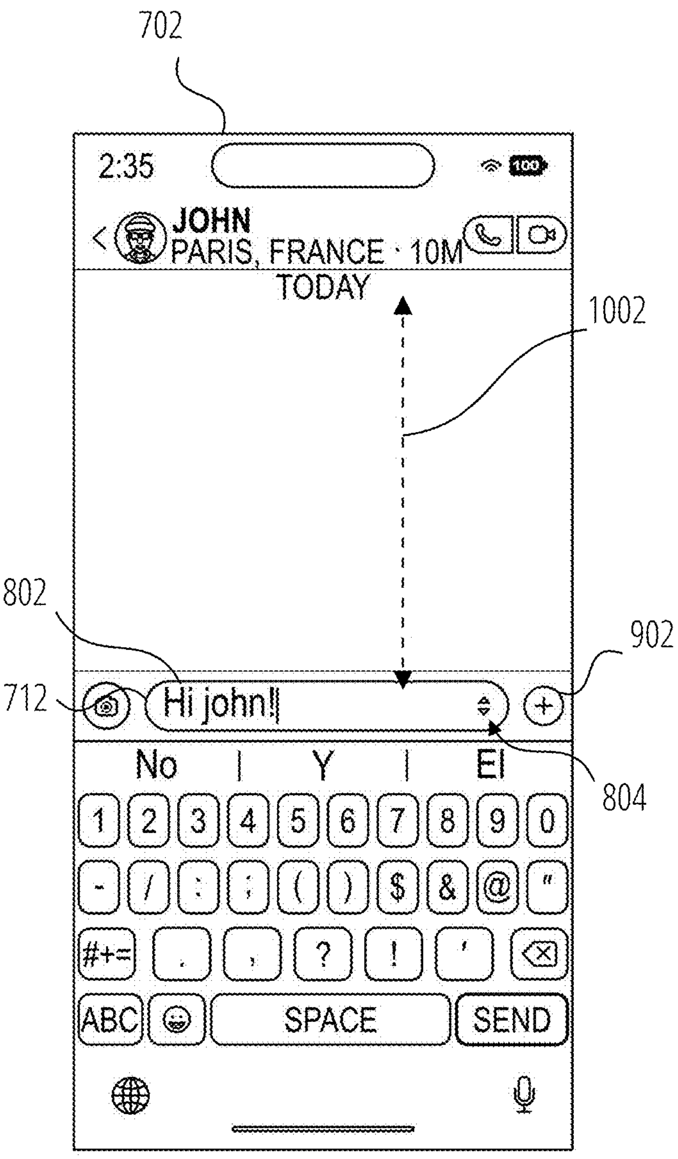
FIG. 10 is a user interface diagram illustrating a messaging user interface including a resizing graphical element, according to some examples.

FIG. 8 to FIG. 10 illustrate the manner in which an editing user input action results in presentation of a resizing graphical element within the messaging user interface 702, according to some examples.

As shown in FIG. 8, as the user starts adding message content 802 to the input bar 712 using the keyboard 714 (the letter "H", in FIG. 8), the interaction client 104 causes a transition in which some of the messaging option graphical elements gradually disappear and a resizing graphical element 804 gradually appears in the messaging user interface 702. FIG. 8 shows an intermediate stage in the transition, where the relevant messaging option graphical elements are still visible but in the process of disappearing from the messaging user interface 702, and the resizing graphical element 804 is already visible but not yet presented in its final appearance.

The resizing graphical element 804 is shown in the example form of a pair of arrows. The pair of arrows may alert the user of the message content resizing option, examples of which are described herein. Accordingly, the pair of arrows may be regarded as a "size grabber" icon.

When comparing FIG. 7, FIG. 8 and FIG. 9, it will be evident that the microphone button 718 and the additional option buttons 720 are caused to become smaller and fade away, as the resizing graphical element 804 appears in the input bar 712 and becomes larger until reaching its final dimensions in the messaging user interface 702.

Further, as the user starts adding the message content 802, the input bar 712 expands horizontally as the microphone button 718 and the additional option buttons 720 disappear. The input bar 712 expands (to the right, along the X-axis of the messaging user interface 702) to take up a portion of the space previously occupied by the additional option buttons 720, while a more options button 902 appears in the message content 802, providing access to the options associated with the buttons that have disappeared.

Accordingly, responsive to detecting an editing user input action (e.g., the user starting to type the words "Hi john!"), the resizing graphical element 804 is automatically displayed within the messaging user interface 702, and the message composition area (input bar 712) is resized by making it larger, with the resizing thereof causing (or necessitating) some of the messaging option graphical element to be removed and be replaced with the more options button 902. In some examples, this adaptive feature provides for more efficient utilization of available space in the user interface.

Referring now to FIG. 10, once the resizing graphical element 804 has been presented, the user is enabled to resize message content using predefined gestures. The resizing graphical element 804 indicates that the input bar 712 can be selected and "dragged" to perform resizing of the text in the input bar 712. While, in some examples, the user is enabled to select and drag other parts of the input bar 712, the examples as described with reference to FIG. 7 to FIG. 19 refer specifically to selection and dragging of the resizing graphical element 804 itself. In other words, the active user selects the "arrows icon" (resizing graphical element 804) and drags it to cause resizing, as further described below.

To transition from the message composing state to the message resizing state, the active user may perform an activation gesture in the example form of a press-and-hold gesture directed at the resizing graphical element 804. The user can then, prior to ending the press-and-hold gesture, perform a resizing gesture in the example form of a dragging gesture to scale the message content 802 up or down in the messaging user interface 702.

The user proceeds to activate the message resizing state by pressing and holding on the input bar 712, and specifically the resizing graphical element 804, and then dragging upwardly along the Y-axis 1002 of the messaging user interface 702 (without releasing the user input element). In other words, the user input element remains held on the screen of the user device and is dragged upwardly. The user input element is dragged upwardly from a base position at which the activation was detected.

In some examples, the base position corresponds to the Y-axis position of the resizing graphical element 804 upon commencement of the message resizing state (the original position of the resizing graphical element 804 as shown in FIG. 10). Accordingly, user selection of the resizing graphical element 804 is detected at the base position and the location of the user input element may then be tracked relative to the base position to track Y-axis translation.

Figure 11:
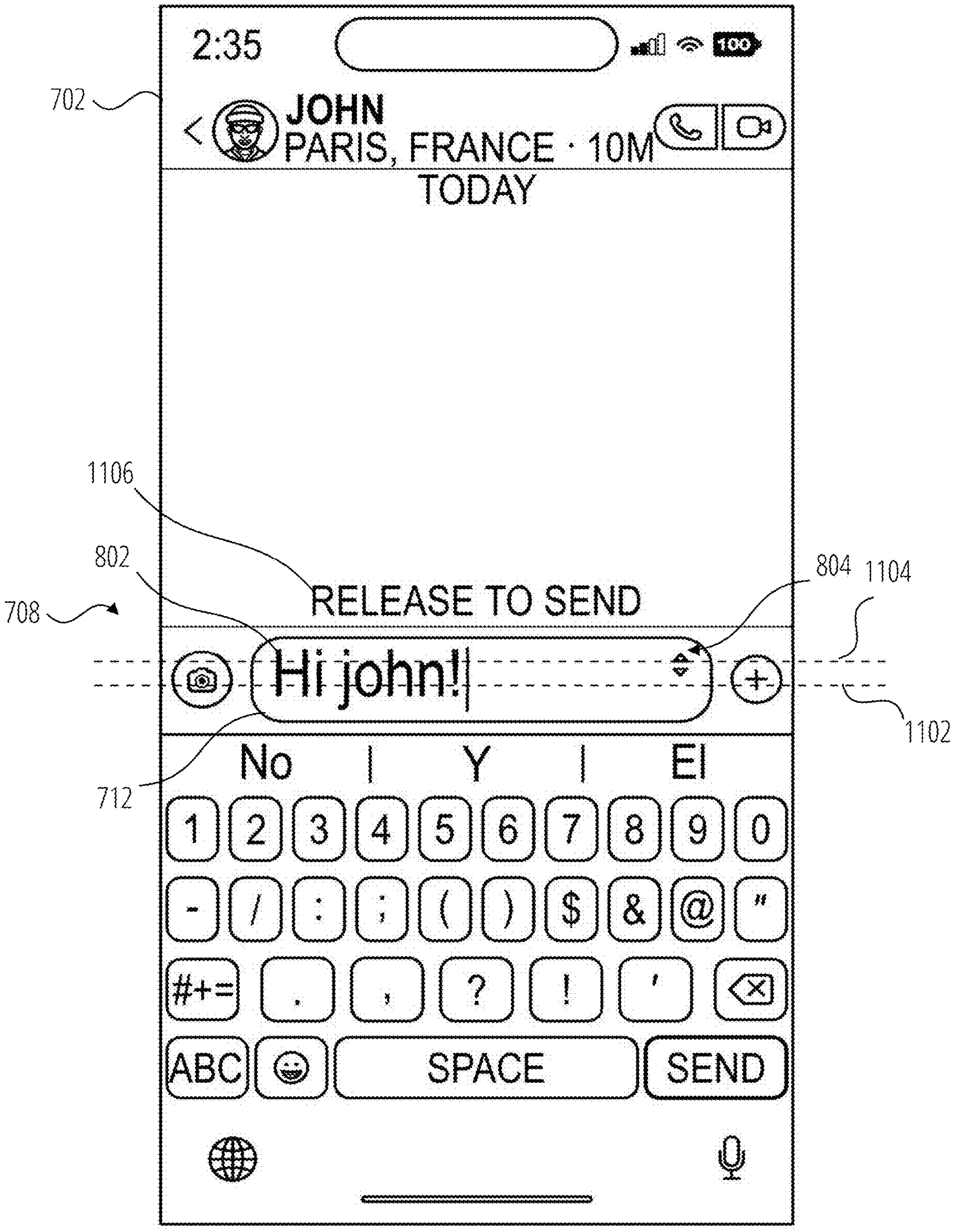
FIG. 11 is a user interface diagram illustrating content resizing in a messaging user interface, according to some examples.
Figure 12:
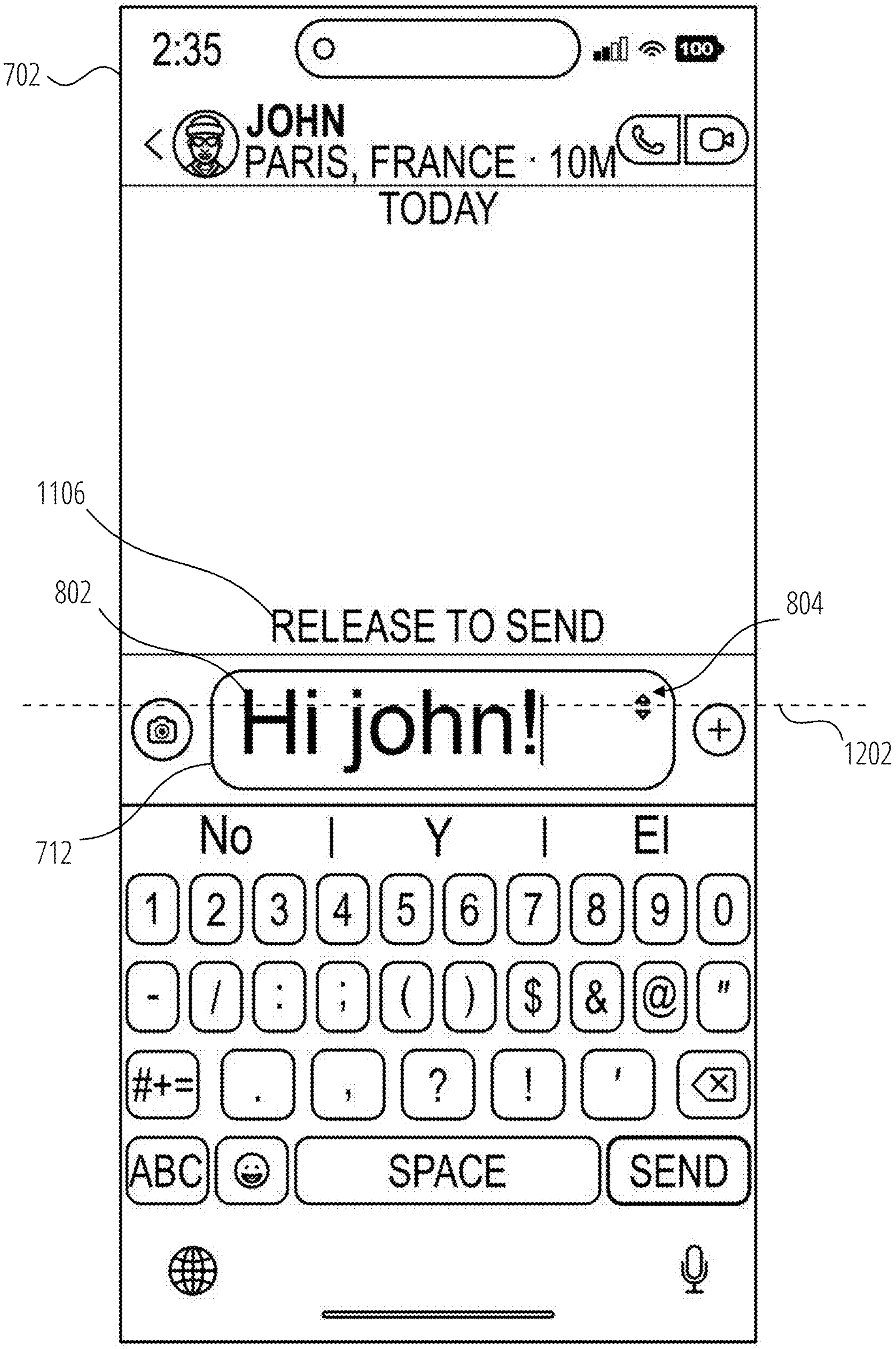
FIG. 12 is a user interface diagram illustrating content resizing in a messaging user interface, according to some examples.
Figure 13:
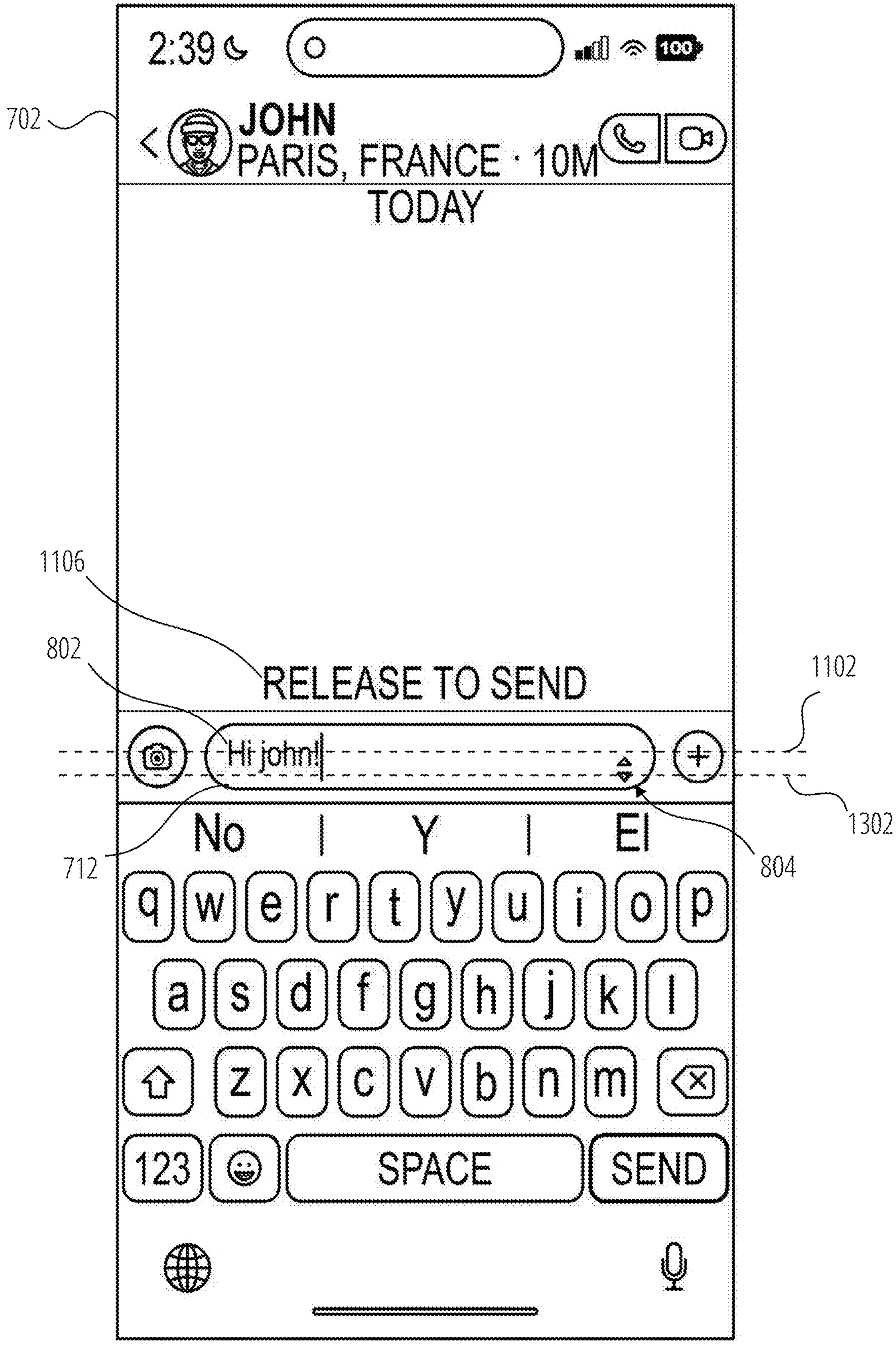
FIG. 13 is a user interface diagram illustrating content resizing in a messaging user interface, according to some examples.

FIG. 11 to FIG. 13 illustrate a resizing process in respect of the message content 802. Turning firstly to FIG. 11, as mentioned above, the user drags the user input element upwardly along the Y-axis 1002 shown in FIG. 10. This results in translation of the user input element from a base level 1102 to an adjusted level 1104. In response to detecting this translation, the interaction client 104 causes the message content 802 to be resized by increasing its font size based on the detected translation and current location of the user input element.

Further, the interaction client 104 causes the resizing graphical element 804 to be displaced upwardly along the Y-axis 1002 so as to align with the adjusted level 1104. In other words, the resizing graphical element 804 may move together with (or substantially together with) the user input element, in some examples, e.g., to enable the user to "move the arrows" to perform resizing in a convenient manner. At the same time, the input bar 712 is scaled up to ensure that it fits the bigger size of the resized message content 802. A haptic component of the mobile device 114 may provide haptic feedback while the resizing is taking place.

Once the message content 802 has been adjusted from the default size to an adjusted size, the interaction client 104 causes a tooltip 1106, or user hint, to be presented in the messaging user interface 702. The tooltip 1106 is presented above the interaction zone 708 and displays the words "RELEASE TO SEND". The tooltip 1106 indicates to the active user that the active user can drag the user input element until satisfied with the adjusted size of the message content 802, and then simply end the resizing gesture by releasing the user input element from the screen of the mobile device 114, causing the message to be transmitted. This may terminate the message resizing state and the interaction client 104 may transition back to the message composing state, in which case the input bar 712 may be presented as empty, allowing the active user to compose a new message.

If the active user drags the user input element back to the base level 1102 (or to within a predefined minimum distance of the base level 1102), the interaction client 104 causes the message content 802 to be resized back to the default size and the input bar 712 to be scaled down, back to the scale shown in FIG. 10. Further, the interaction client 104 causes the tooltip 1106 to disappear, indicating that the "release to send" option is not available when the message content 802 is in the default size. If the active user releases the dragging gesture in this position (at the base level 1102), the interaction client 104 may cause a transition from the message resizing state back to the message composing state, without causing the transmission of the message.

Accordingly, the message content 802 may remain in the input bar 712, presented in the default size. Thus, if the active user decides to cancel the resizing, the active user can simply continue with message composition, or immediately send the original message content (e.g., by pressing a send button), without having to retype the message content.

Referring now to FIG. 12, the active user drags the user input element further up along the Y-axis 1002 shown in FIG. 10. This results in translation of the user input element from the adjusted level 1104 to an adjusted level 1202. The adjusted level 1202 is further away from the base level 1102 than the adjusted level 1104 (higher up along the Y-axis). In response to detecting this translation, the interaction client 104 causes the message content 802 to be resized by increasing its font size even further based on the detected translation and current location of the user input element.

Further, the interaction client 104 causes the resizing graphical element 804 to be displaced upwardly along the Y-axis 1002 so as to align with the adjusted level 1202. As mentioned above, the resizing graphical element 804 may be caused to move together with the user input element. The input bar 712 is scaled up to ensure that it fits the bigger size of the resized message content 802.

The active user may continue scaling up the message content 802 up to a maximum font size, e.g., 170 pt or 180 pt, in which case the resizing graphical element 804 may be presented at a maximum level, e.g., abutting an upper horizontal line of the input bar 712. If the user drags the user input element more than a predefined maximum distance away from the base position (upwardly), the interaction client 104 may either retain the maximum size or, alternatively, cause the size of the message content 802 to "snap back" to the default size.

The causing of movement of the resizing graphical element 804 within the messaging user interface 702 and/or scaling of the input bar 712, by the interaction client 104, to align with movement of the user input bar, according to some examples, can provide for an improved, more efficient messaging system and an intuitive user experience.

Instead of scaling the message content 802 up, the user may wish to scale the message content 802 down. Referring now to FIG. 13, the user drags the user input element down along the Y-axis 1002 (as part of the same, continuous and uninterrupted dragging gesture). This results in translation of the user input element from the adjusted level 1202 to an adjusted level 1302. The adjusted level 1302 is below the base level 1102 (lower down along the Y-axis). In response to detecting this translation, the interaction client 104 causes the message content 802 to be resized by decreasing its font size to a size that is less than the default size (e.g., less than 16 pt), based on the detected translation and current location of the user input element. Specifically, the font size is caused to be decreased gradually in the messaging user interface 702, providing the active user with a visual indication of the reduction in size as the user input element is dragged down along the Y-axis 1002 before it ultimately stops at the adjusted level 1302.

The interaction client 104 causes the resizing graphical element 804 to be displaced downwardly along the Y-axis 1002 so as to align with the adjusted level 1302. At the same time, the input bar 712 is scaled down to conform to the smaller size of the resized message content 802. Again, the haptic component may provide haptic feedback indicating that the message content 802 is being scaled down.

The user may continue scaling down the message content 802 up to a minimum font size, e.g., 8 pt or 7 pt, in which case the resizing graphical element 804 may be presented at a minimum level, e.g., abutting a bottom line of the input bar 712. If the user drags the user input element more than a predefined maximum distance away from the base position (downwardly), the interaction client 104 may either retain the minimum size or, alternatively, cause the message content 802 to "snap back" to the default size.

Figure 14:
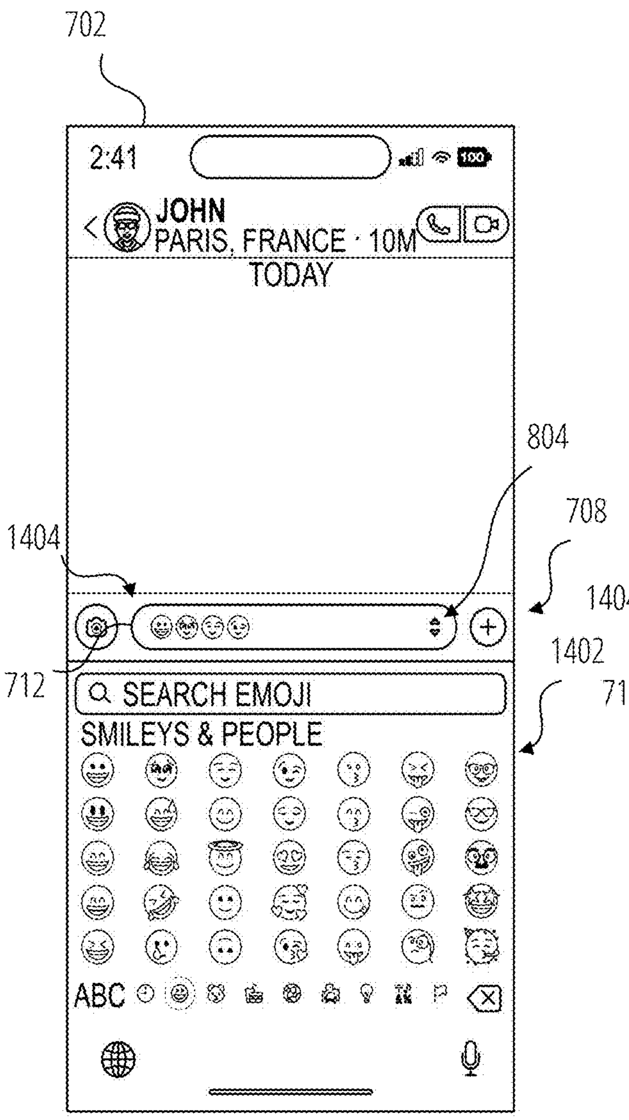
FIG. 14 is a user interface diagram illustrating a messaging user interface including a resizing graphical element, according to some examples.

FIG. 14 illustrates the same messaging user interface 702, but with the emoji keyboard 1402 selected in the interaction zone 708. The active user adds message content 1404 in the example form of four emojis in the input bar 712. The message content 1404 is presented with the resizing graphical element 804 to indicate to the active user that the interaction client 104 provides a resizing option in respect of the message content 1404.

Figure 15:
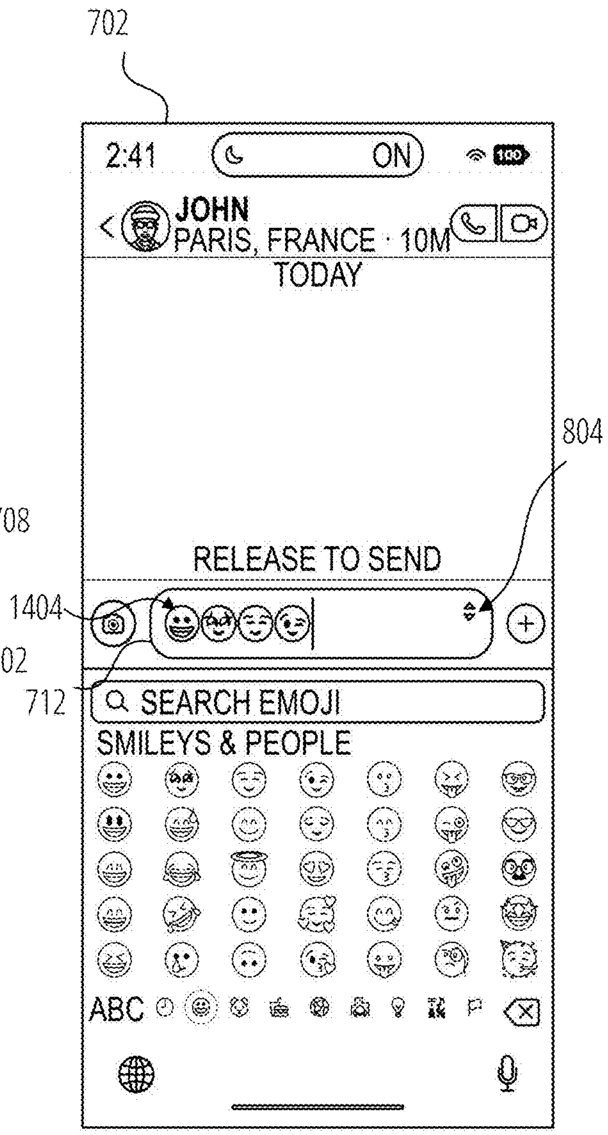
FIG. 15 is a user interface diagram illustrating content resizing in a messaging user interface, according to some examples.
Figure 16:
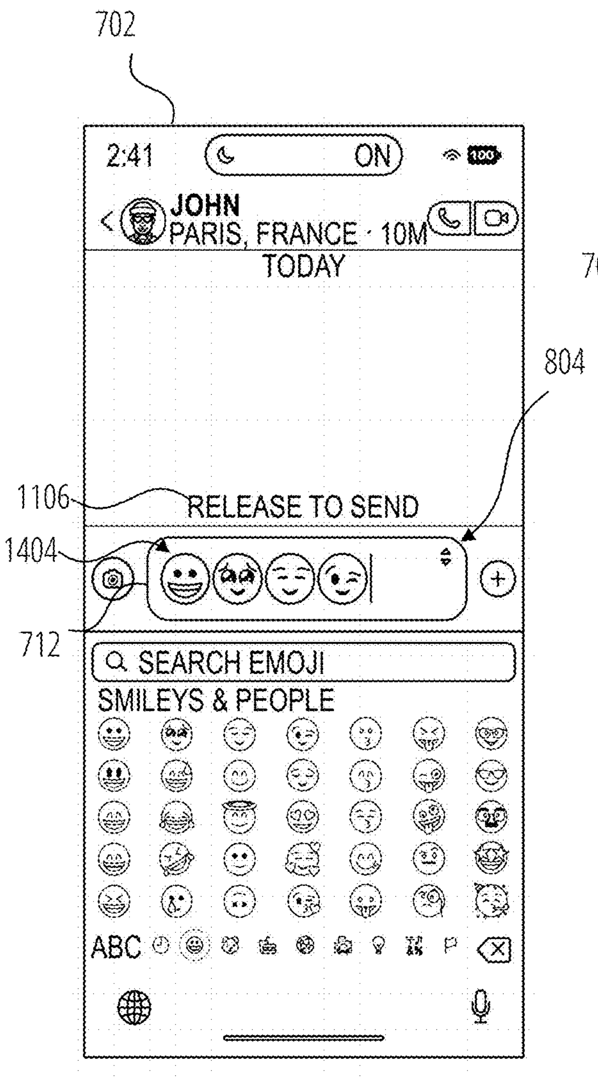
FIG. 16 is a user interface diagram illustrating content resizing in a messaging user interface, according to some examples.

FIG. 15 and FIG. 16 illustrate a resizing process in respect of the message content 1404. This process is similar to the process described with reference to the message content 802. FIG. 15 shows the message content 1404 having been resized to a first adjusted size that is larger than the default size shown in FIG. 14. Accordingly, the resizing graphical element 804 moves upwardly and the input bar 712 is scaled up to accommodate the resized message content 1404.

FIG. 16 shows the message content 1404 having been resized to a second adjusted size that is larger than the first adjusted size shown in FIG. 15. Accordingly, the resizing graphical element 804 moves upwardly to a level higher than the level shown in FIG. 15, and the input bar 712 is scaled up even further to accommodate the resized message content 1404. The tooltip 1106 is shown to indicate, to the active user, that the current gesture may be released to transmit the resized message.

The user decides to release the user input element to end the gesture. This is detected by the interaction client 104 and it causes transmission of a message, including the resized message content 1404 in the size shown in FIG. 16.

As mentioned, responsive to detecting ending of the resizing gesture, transmission of the message content to the recipient ("John") is based on a size of the message content relative to the base size. In this case, the interaction client 104 determines that the size of the message content 1404 corresponds to an adjusted size relative to the base size when the ending of the resizing gesture is detected. Responsive to determining that the size of the message content 1404 corresponds to an adjusted size, transmission of the message comprising the message content 1404 to the recipient is caused by the interaction system 100. On the other hand, if the user decided to drag the resizing graphical element 804 back so that it corresponds to the base (starting position), the interaction client 104 would determine that the size of the message content corresponds to the base size (default size), and in response to determining that the size of the message content corresponds to the base size, the interaction system 100 would cause the message content to be presented in the input bar 712, without transmitting the message to the recipient.

Figure 17:
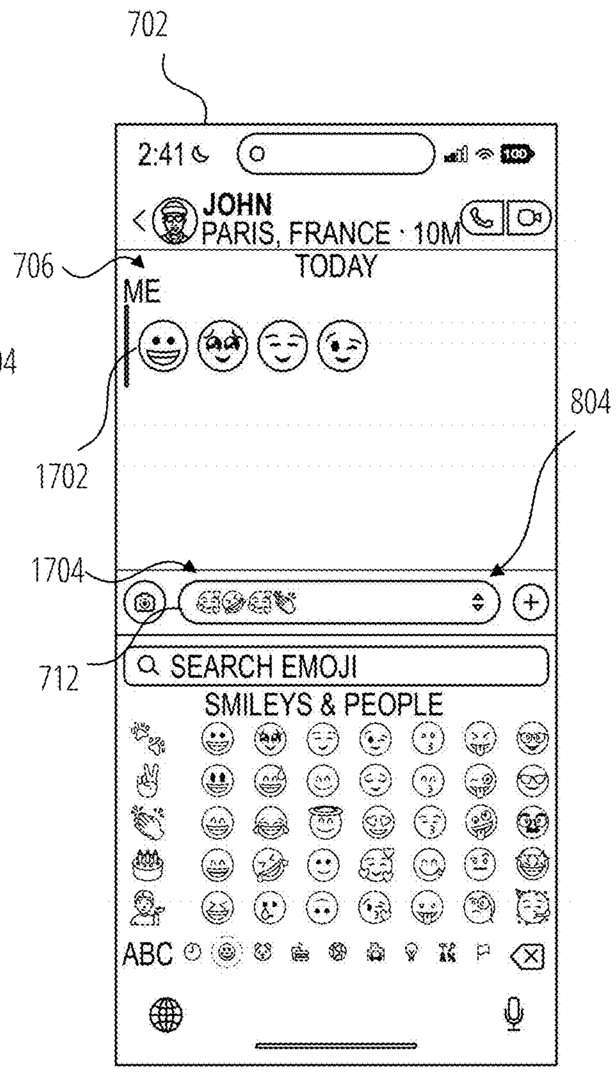
FIG. 17 is a user interface diagram illustrating presentation of a message including resized message content, according to some examples.

Referring now to FIG. 17, the message including the resized message content 1404, which may be referred to as an adjusted size message 1702, is then received by the recipient ("John") and presented, in the size selected by the active user, in the chat history zone 706, as is shown in FIG. 17. The adjusted size message 1702 has a font size that is greater than the default font size of the interaction client 104.

As mentioned above, once the adjusted size message 1702 has been transmitted, the interaction client 104 may cause the "old" message content 1404 to be removed from the input bar 712 and present a cleared (empty) input bar 712 in the messaging user interface 702. FIG. 17 further illustrates new message content 1704 added to the input bar 712 by the active user, to create another message to be sent to the recipient ("John").

Figure 18:
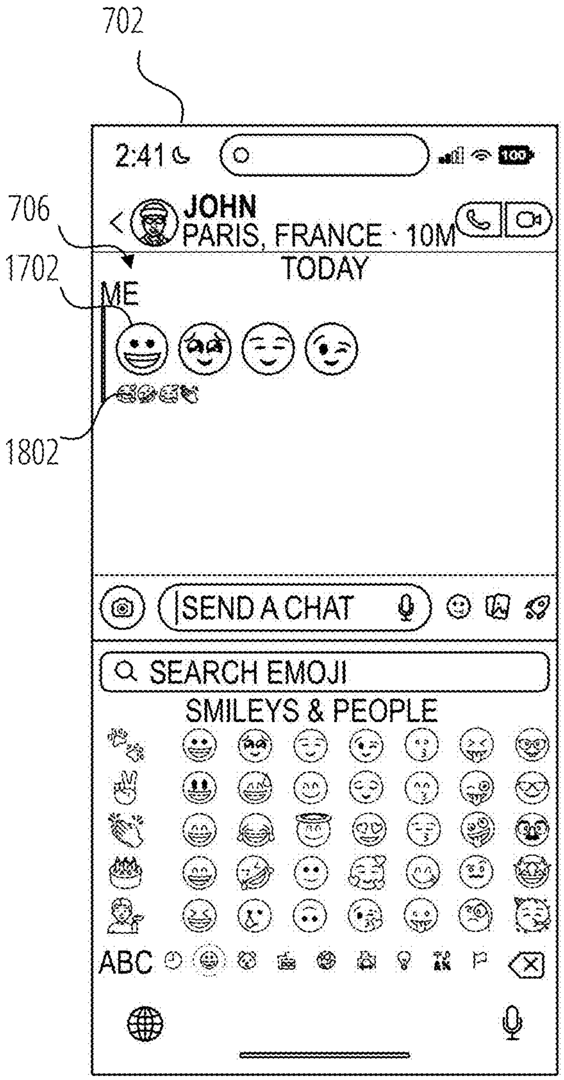
FIG. 18 is a user interface diagram illustrating presentation of messages including resized message content, according to some examples.

In this case, and as shown in FIG. 18, the active user scales the message content 1704 down and sends the message content 1704 in a second adjusted size message 1802 to the other user. The adjusted size message 1802 has a font size that is less than the default font size of the interaction client 104. Once the adjusted size message 1802 has been transmitted, the interaction client 104 causes the "old" message content 1704 to be removed from the input bar 712 and presents a cleared input bar 712 in the messaging user interface 702.

Figure 19:
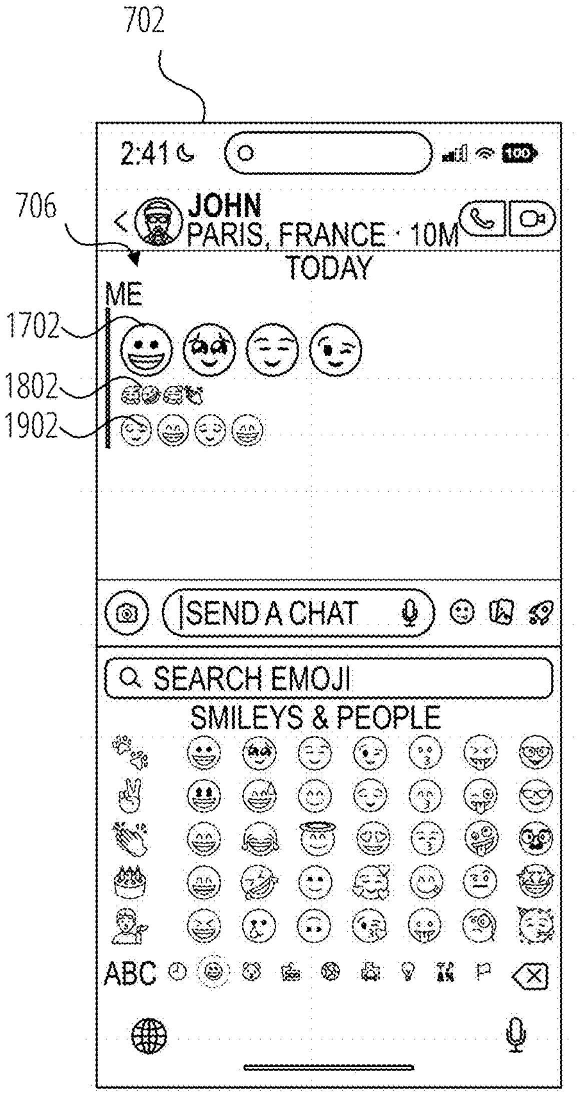
FIG. 19 is a user interface diagram illustrating presentation of messages including resized message content, according to some examples.

FIG. 19 illustrates a third message sent by the active user to the other user. The third message is a default size message 1902, created and sent in a conventional manner, without using the resizing function described herein. As shown in FIG. 19, the default size message 1902 has a font size that is between the size of the adjusted size message 1702 and the size of the adjusted size message 1802. This flexibility may enhance the ability of users to transmit creative and expressive messages in an interaction system.

Figure 20:
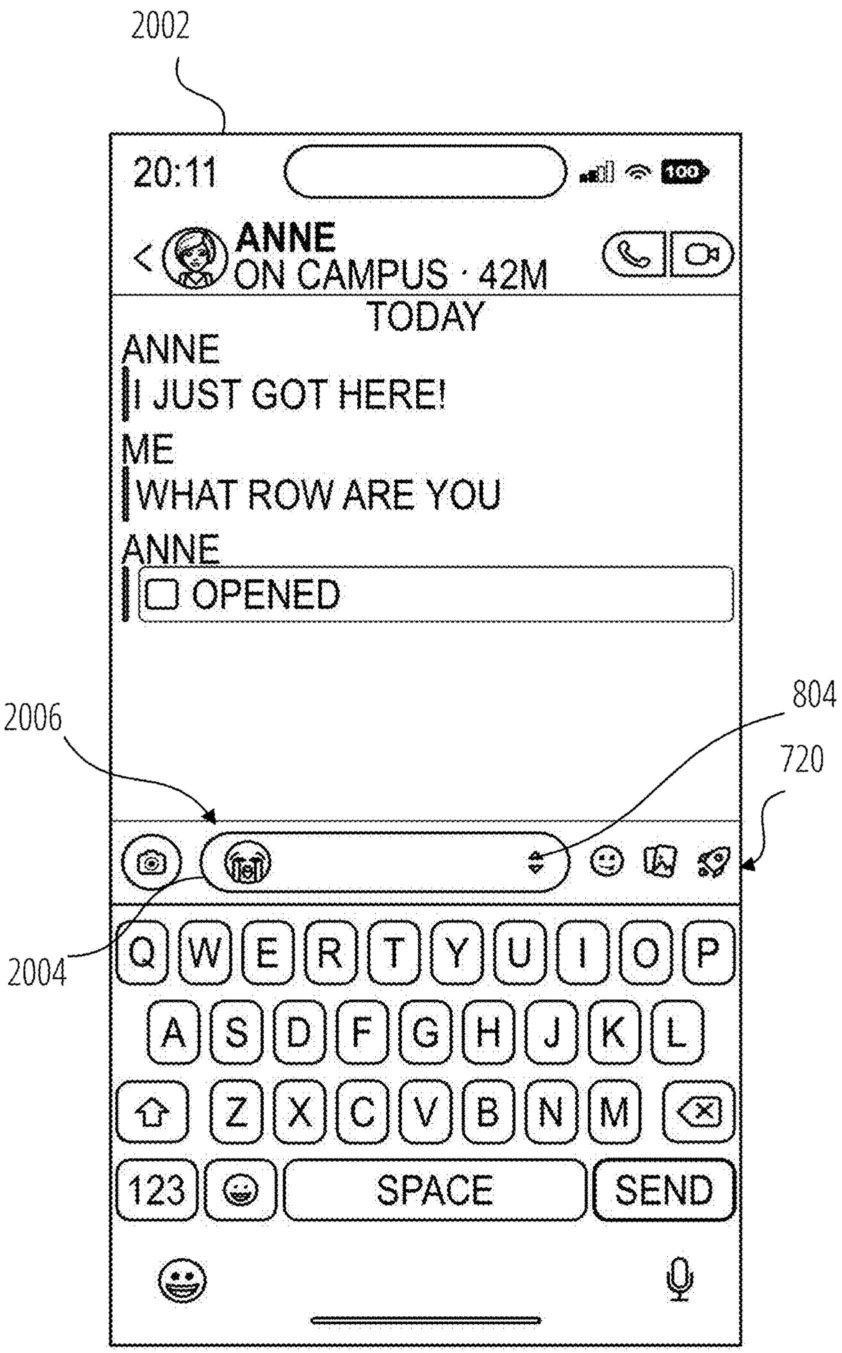
FIG. 20 is a user interface diagram illustrating a messaging user interface including a resizing graphical element, according to some examples.

FIG. 20 is a user interface diagram showing a messaging user interface 2002. The messaging user interface 2002 may be presented by an interaction client 104 executing on a user device such as the mobile device 114. The messaging user interface 2002 is similar to the messaging user interface 702 and repetition is avoided by only highlighting certain differences between the messaging user interface 702 and the messaging user interface 2002 below.

When using the messaging user interface 2002 of FIG. 20, as the active user starts adding message content 2006 to the input bar 2004, e.g., starts typing a message, the interaction client 104 detects the adding of the message content 2006 and responds thereto by modifying the messaging user interface 2002. In FIG. 20, it is shown that the input bar 2004 does not expand horizontally and the additional option buttons 720 remain in position. However, the resizing graphical element 804 replaces a microphone button (not shown) similar to the microphone button 718, to indicate to the user that the resizing feature is accessible.

In some examples, if the active user adds to the message content 2006 such that it exceeds the initially available space in the input bar 2004, the input bar 2004 may at that stage be caused to expand horizontally, e.g., to the right, and this may result in one or more of the additional option buttons 720 disappearing and being replaced with a different button, such as the more options button 902.

System with Head-Wearable Apparatus

Figure 21:
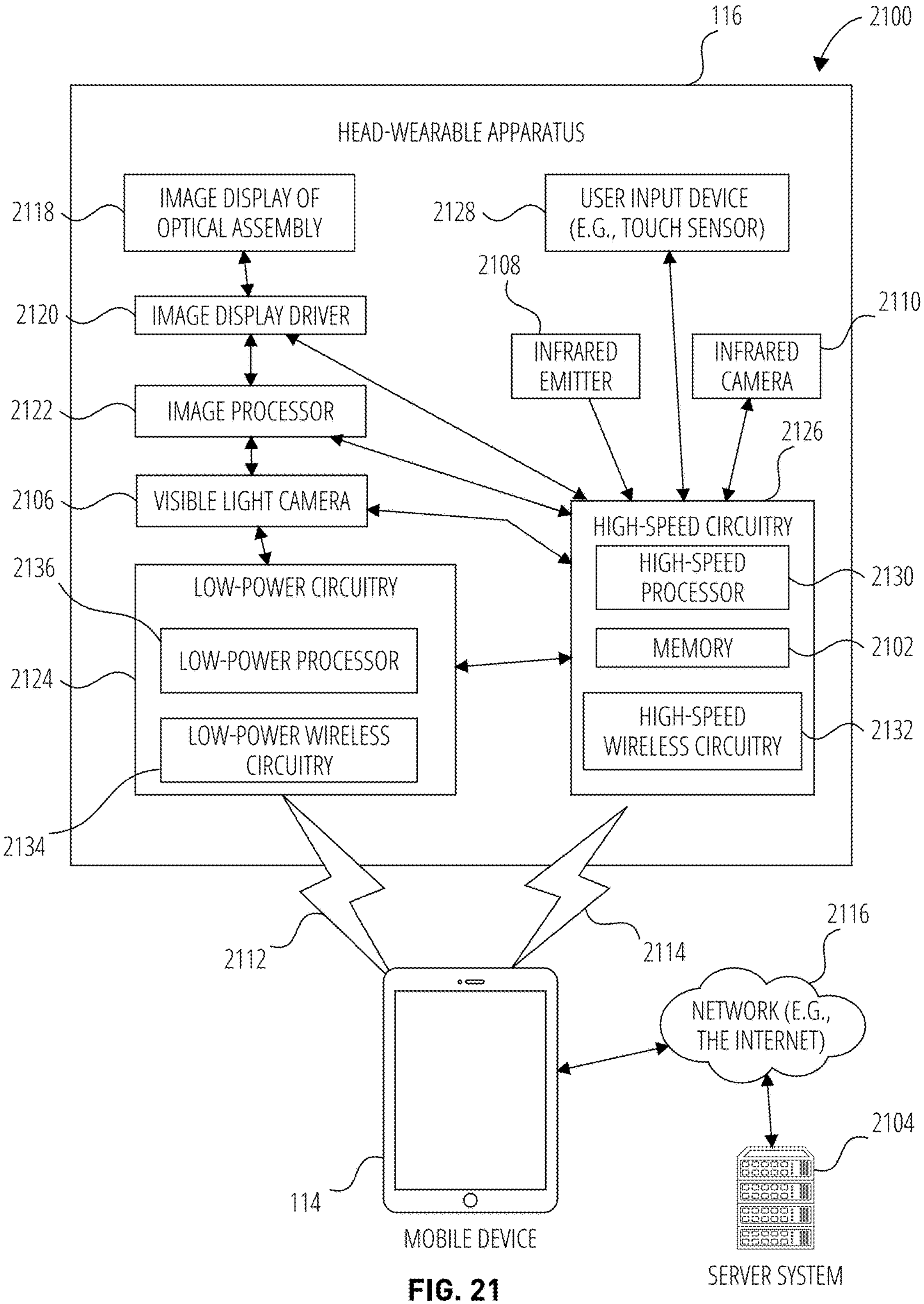
FIG. 21 illustrates a system including a head-wearable apparatus, according to some examples.

FIG. 21 illustrates a system 2100 including a head-wearable apparatus 116 with a selector input device, according to some examples. FIG. 21 is a high-level functional block diagram of an example head-wearable apparatus 116 communicatively coupled to a mobile device 114 and various server systems 2104 (e.g., the interaction server system 110) via various networks 108.

The head-wearable apparatus 116 includes one or more cameras, each of which may be, for example, a visible light camera 2106, an infrared emitter 2108, and an infrared camera 2110.

The mobile device 114 connects with head-wearable apparatus 116 using both a low-power wireless connection 2112 and a high-speed wireless connection 2114. The mobile device 114 is also connected to the server system 2104 and the network 2116.

The head-wearable apparatus 116 further includes two image displays of the image display of optical assembly 2118. The two image displays of optical assembly 2118 include one associated with the left lateral side and one associated with the right lateral side of the head-wearable apparatus 116. The head-wearable apparatus 116 also includes an image display driver 2120, an image processor 2122, low-power circuitry 2124, and high-speed circuitry 2126. The image display of optical assembly 2118 is for presenting images and videos, including an image that can include a graphical user interface to a user of the head-wearable apparatus 116.

The image display driver 2120 commands and controls the image display of optical assembly 2118. The image display driver 2120 may deliver image data directly to the image display of optical assembly 2118 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 2128 (e.g., touch sensor or push button), including an input surface on the head-wearable apparatus 116. The user input device 2128 (e.g., touch sensor or push button) is to receive from the user an input selection to manipulate the graphical user interface of the presented image.

The components shown in FIG. 21 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 2106 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 2102, which stores instructions to perform a subset or all of the functions described herein. The memory 2102 can also include storage device.

As shown in FIG. 21, the high-speed circuitry 2126 includes a high-speed processor 2130, a memory 2102, and high-speed wireless circuitry 2132. In some examples, the image display driver 2120 is coupled to the high-speed circuitry 2126 and operated by the high-speed processor 2130 in order to drive the left and right image displays of the image display of optical assembly 2118. The high-speed processor 2130 may be any processor capable of managing high-speed communications and operation of any general computing system needed for the head-wearable apparatus 116. The high-speed processor 2130 includes processing resources needed for managing high-speed data transfers on a high-speed wireless connection 2114 to a wireless local area network (WLAN) using the high-speed wireless circuitry 2132. In certain examples, the high-speed processor 2130 executes an operating system such as a LINUX operating system or other such operating system of the head-wearable apparatus 116, and the operating system is stored in the memory 2102 for execution. In addition to any other responsibilities, the high-speed processor 2130 executing a software architecture for the head-wearable apparatus 116 is used to manage data transfers with high-speed wireless circuitry 2132. In certain examples, the high-speed wireless circuitry 2132 is configured to implement Institute of Electrical and Electronic Engineers (IEEE) 802.11 communication standards, also referred to herein as WiFi. In some examples, other high-speed communications standards may be implemented by the high-speed wireless circuitry 2132.

The low-power wireless circuitry 2134 and the high-speed wireless circuitry 2132 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 2112 and the high-speed wireless connection 2114, may be implemented using details of the architecture of the head-wearable apparatus 116, as can other elements of the network 2116.

The memory 2102 includes any storage device capable of storing various data and applications, including, among other things, camera data generated by the left and right visible light cameras 2106, the infrared camera 2110, and the image processor 2122, as well as images generated for display by the image display driver 2120 on the image displays of the image display of optical assembly 2118. While the memory 2102 is shown as integrated with high-speed circuitry 2126, in some examples, the memory 2102 may be an independent standalone element of the head-wearable apparatus 116. In certain such examples, electrical routing lines may provide a connection through a chip that includes the high-speed processor 2130 from the image processor 2122 or the low-power processor 2136 to the memory 2102. In some examples, the high-speed processor 2130 may manage addressing of the memory 2102 such that the low-power processor 2136 will boot the high-speed processor 2130 any time that a read or write operation involving memory 2102 is needed.

As shown in FIG. 21, the low-power processor 2136 or high-speed processor 2130 of the head-wearable apparatus 116 can be coupled to the camera (visible light camera 2106, infrared emitter 2108, or infrared camera 2110), the image display driver 2120, the user input device 2128 (e.g., touch sensor or push button), and the memory 2102.

The head-wearable apparatus 116 is connected to a host computer. For example, the head-wearable apparatus 116 is paired with the mobile device 114 via the high-speed wireless connection 2114 or connected to the server system 2104 via the network 2116. The server system 2104 may be one or more computing devices as part of a service or network computing system, for example, that includes a processor, a memory, and network communication interface to communicate over the network 2116 with the mobile device 114 and the head-wearable apparatus 116.

The mobile device 114 includes a processor and a network communication interface coupled to the processor. The network communication interface allows for communication over the network 2116, low-power wireless connection 2112, or high-speed wireless connection 2114. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 2120. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 2104, such as the user input device 2128, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 2112 and high-speed wireless connection 2114 from the mobile device 114 via the low-power wireless circuitry 2134 or high-speed wireless circuitry 2132.

Machine Architecture

Figure 22:
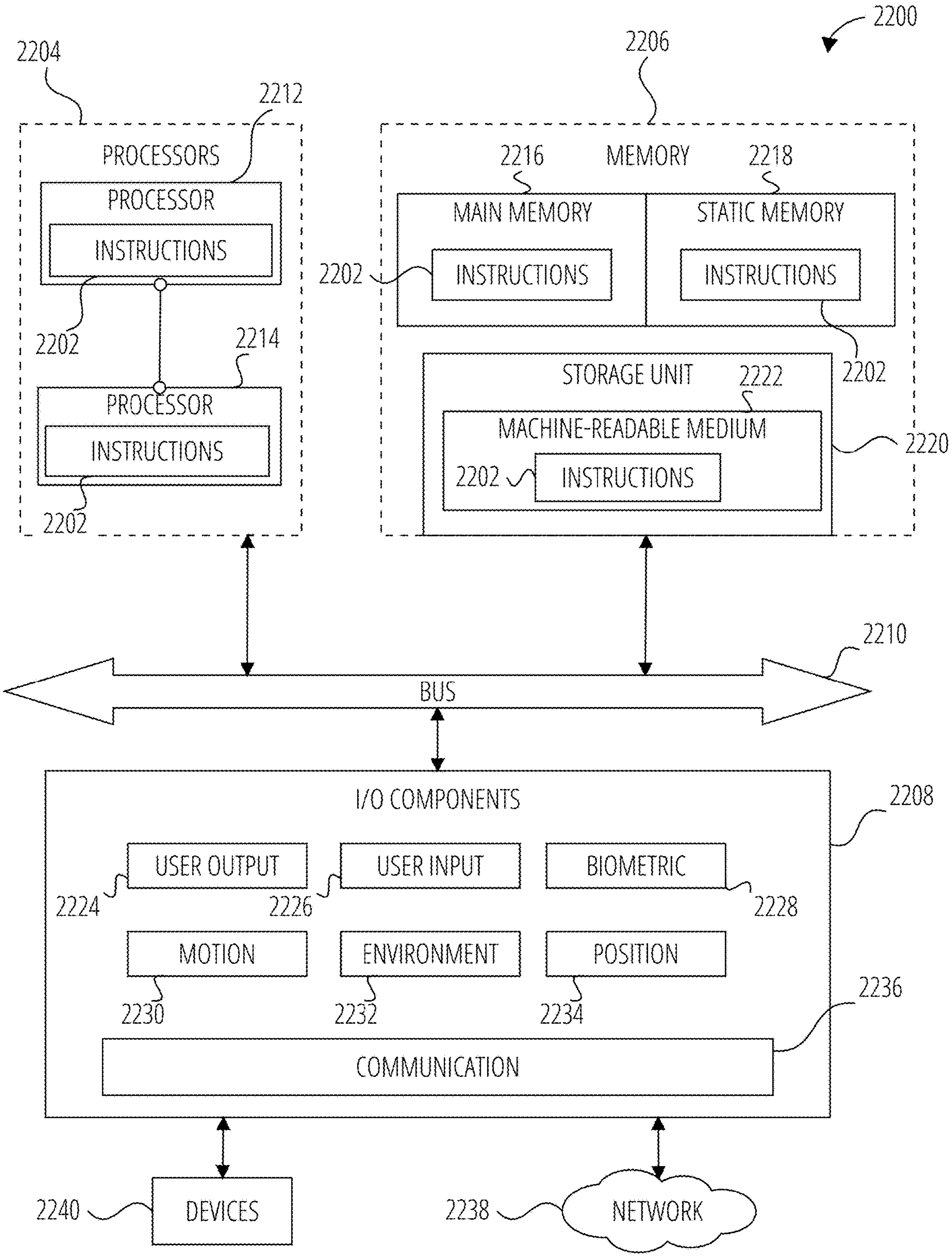
FIG. 22 is a diagrammatic representation of a machine in the form of a computer system within which a set of instructions may be executed to cause the machine to perform any one or more of the methodologies discussed herein, according to some examples.

FIG. 22 is a diagrammatic representation of the machine 2200 within which instructions 2202 (e.g., software, a program, an application, an applet, an app, or other executable code) for causing the machine 2200 to perform any one or more of the methodologies discussed herein may be executed. For example, the instructions 2202 may cause the machine 2200 to execute any one or more of the methods described herein. The instructions 2202 transform the general, non-programmed machine 2200 into a particular machine 2200 programmed to carry out the described and illustrated functions in the manner described. The machine 2200 may operate as a standalone device or may be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2202, sequentially or otherwise, that specify actions to be taken by the machine 2200. Further, while a single machine 2200 is illustrated, the term "machine" shall also be taken to include a collection of machines that individually or jointly execute the instructions 2202 to perform any one or more of the methodologies discussed herein. The machine 2200, for example, may comprise the user system 102 or any one of multiple server devices forming part of the interaction server system 110. In some examples, the machine 2200 may also comprise both client and server systems, with certain operations of a particular method or algorithm being performed on the server-side and with certain operations of the particular method or algorithm being performed on the client-side.

The machine 2200 may include processors 2204, memory 2206, and input/output I/O components 2208, which may be configured to communicate with each other via a bus 2210. In an example, the processors 2204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2212 and a processor 2214 that execute the instructions 2202. The term "processor" is intended to include multi-core processors that may comprise two or more independent processors (sometimes referred to as "cores") that may execute instructions contemporaneously. Although FIG. 22 shows multiple processors 2204, the machine 2200 may include a single processor with a single-core, a single processor with multiple cores (e.g., a multi-core processor), multiple processors with a single core, multiple processors with multiples cores, or any combination thereof.

The memory 2206 includes a main memory 2216, a static memory 2218, and a storage unit 2220, both accessible to the processors 2204 via the bus 2210. The main memory 2206, the static memory 2218, and storage unit 2220 store the instructions 2202 embodying any one or more of the methodologies or functions described herein. The instructions 2202 may also reside, completely or partially, within the main memory 2216, within the static memory 2218, within machine-readable medium 2222 within the storage unit 2220, within at least one of the processors 2204 (e.g., within the processor's cache memory), or any suitable combination thereof, during execution thereof by the machine 2200.

The I/O components 2208 may include a wide variety of components to receive input, provide output, produce output, transmit information, exchange information, capture measurements, and so on. The specific I/O components 2208 that are included in a particular machine will depend on the type of machine. For example, portable machines such as mobile phones may include a touch input device or other such input mechanisms, while a headless server machine will likely not include such a touch input device. It will be appreciated that the I/O components 2208 may include many other components that are not shown in FIG. 22. In various examples, the I/O components 2208 may include user output components 2224 and user input components 2226. The user output components 2224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2208 may include biometric components 2228, motion components 2230, environmental components 2232, or position components 2234, among a wide array of other components. For example, the biometric components 2228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2230 include acceleration sensor components (e.g., accelerometer), gravitation sensor components, rotation sensor components (e.g., gyroscope).

The environmental components 2232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 2234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2208 further include communication components 2236 operable to couple the machine 2200 to a network 2238 or devices 2240 via respective coupling or connections. For example, the communication components 2236 may include a network interface component or another suitable device to interface with the network 2238. In further examples, the communication components 2236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2240 may be another machine or any of a wide variety of peripheral devices (e.g., a peripheral device coupled via a USB).

Moreover, the communication components 2236 may detect identifiers or include components operable to detect identifiers. For example, the communication components 2236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2236, such as location via Internet Protocol (IP) geolocation, location via Wi-Fi® signal triangulation, location via detecting an NFC beacon signal that may indicate a particular location, and so forth.

The various memories (e.g., main memory 2216, static memory 2218, and memory of the processors 2204) and storage unit 2220 may store one or more sets of instructions and data structures (e.g., software) embodying or used by any one or more of the methodologies or functions described herein. These instructions (e.g., the instructions 2202), when executed by processors 2204, cause various operations to implement the disclosed examples.

The instructions 2202 may be transmitted or received over the network 2238, using a transmission medium, via a network interface device (e.g., a network interface component included in the communication components 2236) and using any one of several well-known transfer protocols (e.g., hypertext transfer protocol (HTTP)). Similarly, the instructions 2202 may be transmitted or received using a transmission medium via a coupling (e.g., a peer-to-peer coupling) to the devices 2240.

Software Architecture

Figure 23:
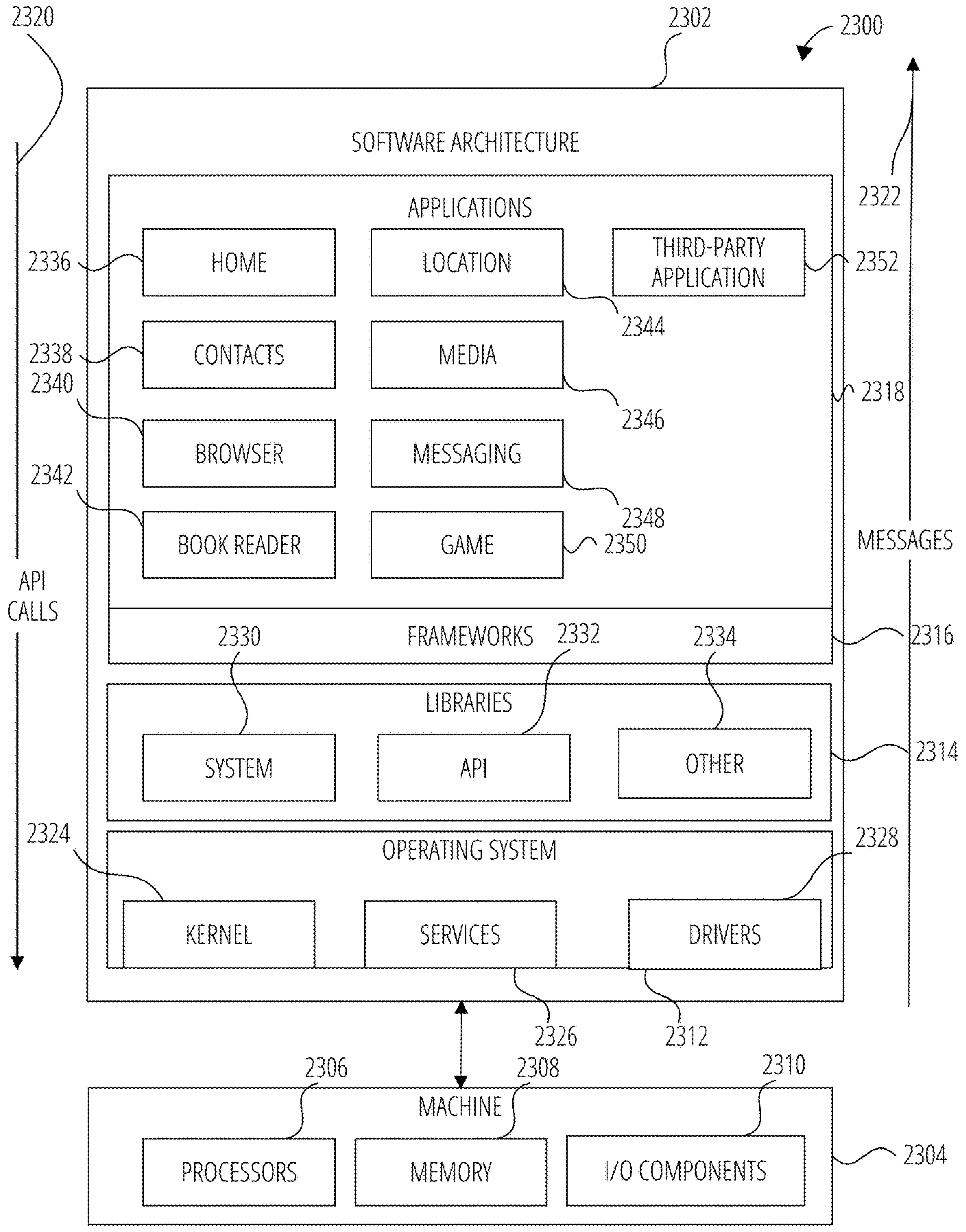
FIG. 23 is a block diagram showing a software architecture within which examples may be implemented.

FIG. 23 is a block diagram 2300 illustrating a software architecture 2302, which can be installed on any one or more of the devices described herein. The software architecture 2302 is supported by hardware such as a machine 2304 that includes processors 2306, memory 2308, and I/O components 2310. In this example, the software architecture 2302 can be conceptualized as a stack of layers, where each layer provides a particular functionality. The software architecture 2302 includes layers such as an operating system 2312, libraries 2314, frameworks 2316, and applications 2318. Operationally, the applications 2318 invoke API calls 2320 through the software stack and receive messages 2322 in response to the API calls 2320.

The operating system 2312 manages hardware resources and provides common services. The operating system 2312 includes, for example, a kernel 2324, services 2326, and drivers 2328. The kernel 2324 acts as an abstraction layer between the hardware and the other software layers. For example, the kernel 2324 provides memory management, processor management (e.g., scheduling), component management, networking, and security settings, among other functionalities. The services 2326 can provide other common services for the other software layers. The drivers 2328 are responsible for controlling or interfacing with the underlying hardware. For instance, the drivers 2328 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2314 provide a common low-level infrastructure used by the applications 2318. The libraries 2314 can include system libraries 2330 (e.g., C standard library) that provide functions such as memory allocation functions, string manipulation functions, mathematic functions, and the like. In addition, the libraries 2314 can include API libraries 2332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2314 can also include a wide variety of other libraries 2334 to provide many other APIs to the applications 2318.

The frameworks 2316 provide a common high-level infrastructure that is used by the applications 2318. For example, the frameworks 2316 provide various graphical user interface (GUI) functions, high-level resource management, and high-level location services. The frameworks 2316 can provide a broad spectrum of other APIs that can be used by the applications 2318, some of which may be specific to a particular operating system or platform.

In an example, the applications 2318 may include a home application 2336, a contacts application 2338, a browser application 2340, a book reader application 2342, a location application 2344, a media application 2346, a messaging application 2348, a game application 2350, and a broad assortment of other applications such as a third-party application 2352. The applications 2318 are programs that execute functions defined in the programs. Various programming languages can be employed to create one or more of the applications 2318, structured in a variety of manners, such as object-oriented programming languages (e.g., Objective-C, Java, or C++) or procedural programming languages (e.g., C or assembly language). In a specific example, the third-party application 2352 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2352 can invoke the API calls 2320 provided by the operating system 2312 to facilitate functionalities described herein.

Time-Based Access Architecture

Figure 24:
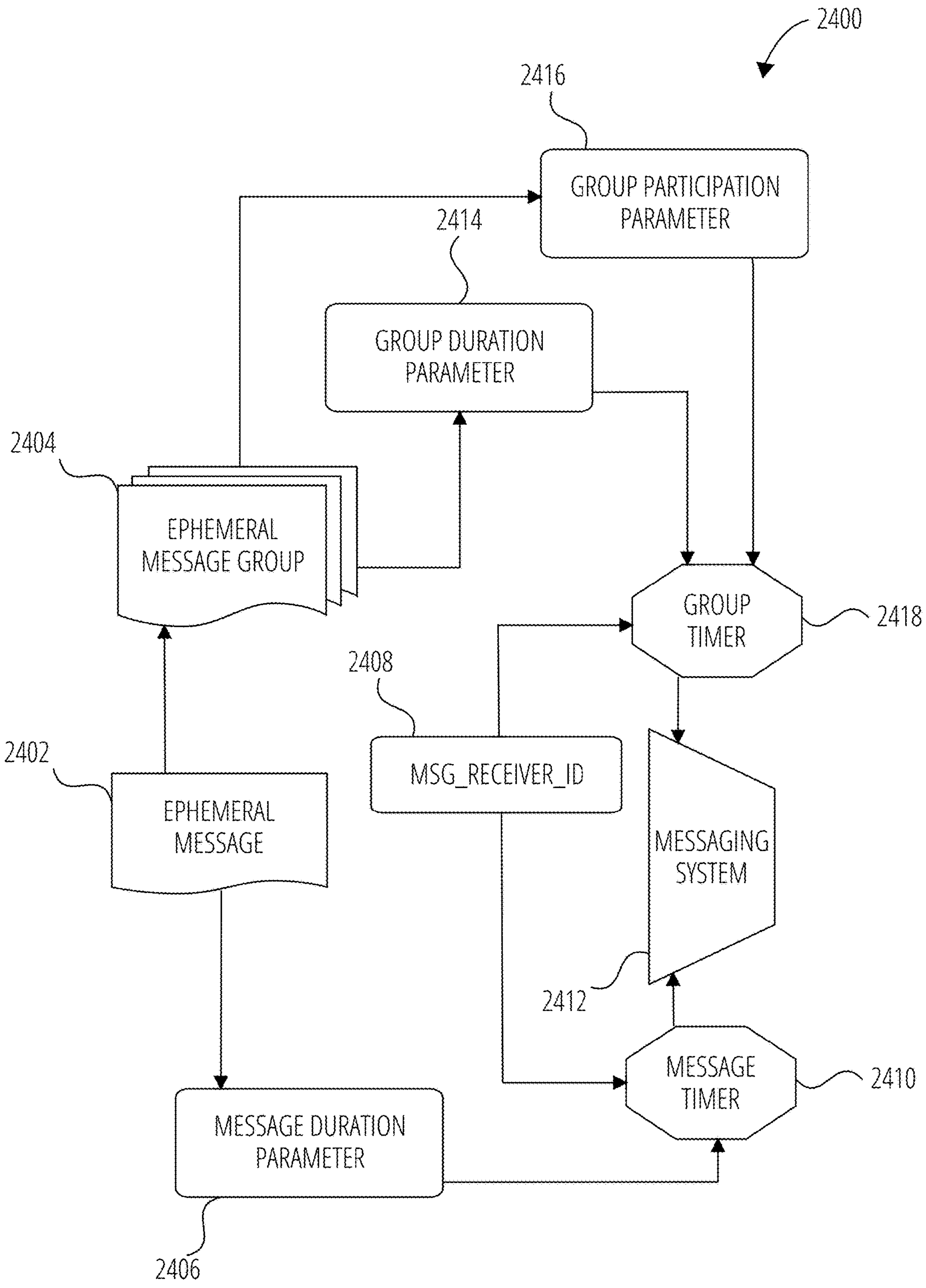
FIG. 24 is a flowchart for an access-limiting process, according to some examples.

FIG. 24 is a schematic diagram illustrating an access-limiting process 2400, in terms of which access to content (e.g., an ephemeral message 2402 and associated multimedia payload of data) or a content collection (e.g., an ephemeral message group 2404) may be time-limited (e.g., made ephemeral).

An ephemeral message 2402 is shown to be associated with a message duration parameter 2406, the value of which determines the amount of time that the ephemeral message 2402 will be displayed to a receiving user of the ephemeral message 2402 by the interaction client 104. In some examples, an ephemeral message 2402 is viewable by a receiving user for up to a maximum of 10 seconds, depending on the amount of time that the sending user specifies using the message duration parameter 2406.

The message duration parameter 2406 and the message receiver identifier 2408 are shown to be inputs to a message timer 2410, which is responsible for determining the amount of time that the ephemeral message 2402 is shown to a particular receiving user identified by the message receiver identifier 2408. In particular, the ephemeral message 2402 will be shown to the relevant receiving user for a time period determined by the value of the message duration parameter 2406. The message timer 2410 is shown to provide output to a more generalized messaging system 2412, which is responsible for the overall timing of display of content (e.g., an ephemeral message 2402) to a receiving user.

The ephemeral message 2402 is shown in FIG. 24 to be included within an ephemeral message group 2404 (e.g., a collection of messages in a personal story, or an event story). The ephemeral message group 2404 has an associated group duration parameter 2414, a value of which determines a time duration for which the ephemeral message group 2404 is presented and accessible to users of the interaction system 100. The group duration parameter 2414, for example, may be the duration of a music concert, where the ephemeral message group 2404 is a collection of content pertaining to that concert. Alternatively, a user (either the owning user or a curator user) may specify the value for the group duration parameter 2414 when performing the setup and creation of the ephemeral message group 2404.

Additionally, each ephemeral message 2402 within the ephemeral message group 2404 has an associated group participation parameter 2416, a value of which determines the duration of time for which the ephemeral message 2402 will be accessible within the context of the ephemeral message group 2404. Accordingly, a particular ephemeral message group 2404 may “expire” and become inaccessible within the context of the ephemeral message group 2404 prior to the ephemeral message group 2404 itself expiring in terms of the group duration parameter 2414. The group duration parameter 2414, group participation parameter 2416, and message receiver identifier 2408 each provide input to a group timer 2418, which operationally determines, firstly, whether a particular ephemeral message 2402 of the ephemeral message group 2404 will be displayed to a particular receiving user and, if so, for how long. Note that the ephemeral message group 2404 is also aware of the identity of the particular receiving user as a result of the message receiver identifier 2408.

Accordingly, the group timer 2418 operationally controls the overall lifespan of an associated ephemeral message group 2404 as well as an individual ephemeral message 2402 included in the ephemeral message group 2404. In some examples, each and every ephemeral message 2402 within the ephemeral message group 2404 remains viewable and accessible for a time period specified by the group duration parameter 2414. In a further example, a certain ephemeral message 2402 may expire within the context of ephemeral message group 2404 based on a group participation parameter 2416. Note that a message duration parameter 2406 may still determine the duration of time for which a particular ephemeral message 2402 is displayed to a receiving user, even within the context of the ephemeral message group 2404. Accordingly, the message duration parameter 2406 determines the duration of time that a particular ephemeral message 2402 is displayed to a receiving user regardless of whether the receiving user is viewing that ephemeral message 2402 inside or outside the context of an ephemeral message group 2404.

The messaging system 2412 may furthermore operationally remove a particular ephemeral message 2402 from the ephemeral message group 2404 based on a determination that it has exceeded an associated group participation parameter 2416. For example, when a sending user has established a group participation parameter 2416 of 24 hours from posting, the messaging system 2412 will remove the relevant ephemeral message 2402 from the ephemeral message group 2404 after the specified 24 hours. The messaging system 2412 also operates to remove an ephemeral message group 2404 when either the group participation parameter 2416 for each and every ephemeral message 2402 within the ephemeral message group 2404 has expired, or when the ephemeral message group 2404 itself has expired in terms of the group duration parameter 2414.

In certain use cases, a creator of a particular ephemeral message group 2404 may specify an indefinite group duration parameter 2414. In this case, the expiration of the group participation parameter 2416 for the last remaining ephemeral message 2402 within the ephemeral message group 2404 will determine when the ephemeral message group 2404 itself expires. In this case, a new ephemeral message 2402, added to the ephemeral message group 2404, with a new group participation parameter 2416, effectively extends the life of an ephemeral message group 2404 to equal the value of the group participation parameter 2416.

Responsive to the messaging system 2412 determining that an ephemeral message group 2404 has expired (e.g., is no longer accessible), the messaging system 2412 communicates with the interaction system 100 (and, for example, specifically the interaction client 104) to cause an indicium (e.g., an icon) associated with the relevant ephemeral message group 2404 to no longer be displayed within a user interface of the interaction client 104. Similarly, when the messaging system 2412 determines that the message duration parameter 2406 for a particular ephemeral message 2402 has expired, the messaging system 2412 causes the interaction client 104 to no longer display an indicium (e.g., an icon or textual identification) associated with the ephemeral message 2402.

Certain messages that include resized message content, as described herein, may be transmitted as ephemeral messages.

CONCLUSION

Examples of the present disclosure may enable users to resize message content using gestures. Examples provide a user-friendly, yet powerful, messaging technique.

An example technical problem of providing gesture-based message content resizing functionality can be addressed or alleviated by linking message content size to a location in a user interface and/or translation of an element across a user interface, and dynamically tracking the location/translation based on gestures to cause automatic resizing of message content. Such an example problem can also be addressed or alleviated by enabling a user to engage a user-selectable resizing graphical element in the user interface by way of an activation gesture (e.g., a press-and-hold gesture), and then to perform a resizing gesture (e.g., a dragging gesture performed before a holding stage of the press-and-hold gesture is ended) to cause the automatic resizing of message content. In some examples, the resizing graphical element is caused to be displaced dynamically within the user interface as message content is being resized, allowing the user to track and/or better understand the resizing feature.

An example technical problem of enabling automatic transmission of a resized message from a user system based on a gesture, while enabling a user to transition away from the message resizing state automatically without transmitting the message, can be addressed or alleviated by causing the message to be transmitted only if, at the time of ending the gesture, a size of the message content corresponds to a predefined (adjusted or resized) size, or a tracked location corresponds to a predefined position.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts to perform an action, or an interaction with other users or computer systems.

What is claimed is:

1. A method comprising:

causing presentation of a user interface at a user device, the user interface comprising a message composition area in which a user can add or edit message content;

detecting an editing user input action in the message composition area by which the user adds or edits the message content, the message content presented in a base size;

based on detecting the editing user input action:

resizing the message composition area, removing at least one user-selectable messaging option graphical element from the user interface, and causing presentation, within the message composition area of the user interface, of a resizing graphical element indicating availability of a resizing function for adjusting a size of the message content, the resizing graphical element presented at a base position within the user interface;

detecting commencement of a resizing gesture at the base position;

while the resizing gesture is in progress, tracking the resizing gesture and dynamically resizing the message content in the message composition area as positioning of the resizing gesture changes relative to the base position;

detecting ending of the resizing gesture at an adjusted position relative to the base position; and based on detecting the ending of the resizing gesture at the adjusted position, causing transmission of a message comprising the message content in an adjusted size relative to the base size.

2. The method of claim 1, wherein the dynamic resizing of the message content comprises gradually adjusting the size of the message content relative to the base size as the resizing gesture moves further away from the base position.

3. The method of claim 1, wherein the resizing gesture comprises a dragging gesture.

4. The method of claim 3, wherein the user device comprises a touch-sensitive display, the resizing gesture is performed by the user of the user device by engaging the touch-sensitive display, and the ending of the resizing gesture is detected based on the user disengaging from the touch-sensitive display.

5. The method of claim 1, wherein the resizing gesture is tracked along a predetermined axis of the user interface.

6. The method of claim 1, further comprising:

based on detecting the ending of the resizing gesture, terminating a message resizing state in which the size of the message content is adjustable.

7. The method of claim 1, further comprising:

detecting user selection of the resizing graphical element at the base position.

8. The method of claim 7, wherein the user selection of the resizing graphical element at the base position comprises commencement of an activation gesture.

9. The method of claim 8, wherein the activation gesture commences prior to the commencement of the resizing gesture.

10. The method of claim 8, wherein the activation gesture comprises a press-and-hold gesture, and the resizing gesture comprises a dragging gesture that commences subsequent to commencement of, but prior to ending of, the press-and-hold gesture.

11. The method of claim 10, wherein the user device comprises a touch-sensitive display, the press-and-hold gesture is performed by the user of the user device by engaging the touch-sensitive display, and the ending of the resizing gesture is detected based on the user releasing the press-and-hold gesture.

12. The method of claim 8, further comprising:

based on detecting the activation gesture, causing a transition from a message composing state in which the message content is editable to a message resizing state in which the size of the message content is adjustable.

13. The method of claim 1, further comprising:

detecting that the adjusted position meets a predetermined minimum distance threshold prior to causing the transmission of the message.

14. The method of claim 1, wherein the resizing gesture is tracked between a plurality of positions including the base position and the adjusted position, the plurality of positions further comprises one or more positions between the base position and the adjusted position, and the resizing gesture causes gradual adjustment of the size of the message content from the base size to the adjusted size based on adjustment of the positioning of the resizing gesture between the base position and the adjusted position.

15. The method of claim 1, further comprising:

detecting translation of the resizing gesture along a Y-axis of the user interface, the size of the message content being adjusted by:

based on detecting that the translation is an upward translation along the Y-axis, causing the size of the message content to be increased; and based on detecting that the translation is a downward translation along the Y-axis, causing the size of the message content to be decreased.

16. The method of claim 1, further comprising:

causing the user device to provide haptic feedback contemporaneously with the dynamic resizing of the message content.

17. A computing apparatus comprising:

at least one processor; and at least one memory storing instructions that, when executed by the at least one processor, configure the computing apparatus to perform operations comprising:

causing presentation of a user interface comprising a message composition area in which a user can add or edit message content;

detecting an editing user input action in the message composition area by which the user adds or edits the message content, the message content presented in a base size;

based on detecting the editing user input action:

resizing the message composition area, removing at least one user-selectable messaging option graphical element from the user interface, and causing presentation, within the message composition area of the user interface, of a resizing graphical element indicating availability of a resizing function for adjusting a size of the message content, the resizing graphical element presented at a base position within the user interface;

detecting commencement of a resizing gesture at the base position;

while the resizing gesture is in progress, tracking the resizing gesture and dynamically resizing the message content in the message composition area as positioning of the resizing gesture changes relative to the base position;

detecting ending of the resizing gesture at an adjusted position relative to the base position; and based on detecting the ending of the resizing gesture at the adjusted position, causing transmission of a message comprising the message content in an adjusted size relative to the base size.

18. At least one non-transitory computer-readable storage medium, the at least one non-transitory computer-readable storage medium including instructions that when executed by a computing apparatus, cause the computing apparatus to perform operations comprising:

causing presentation of a user interface comprising a message composition area in which a user can add or edit message content;

detecting an editing user input action in the message composition area by which the user adds or edits the message content, the message content presented in a base size;

based on detecting the editing user input action:

resizing the message composition area, removing at least one user-selectable messaging option graphical element from the user interface, and causing presentation, within the message composition area of the user interface, of a resizing graphical element indicating availability of a resizing function for adjusting a size of the message content, the resizing graphical element presented at a base position within the user interface;

detecting commencement of a resizing gesture at the base position;

while the resizing gesture is in progress, tracking the resizing gesture and dynamically resizing the message content in the message composition area as positioning of the resizing gesture changes relative to the base position;

detecting ending of the resizing gesture at an adjusted position relative to the base position; and based on detecting the ending of the resizing gesture at the adjusted position, causing transmission of a message comprising the message content in an adjusted size relative to the base size.

* * * * *